US012315008B2

(12) United States Patent
Jayaram et al.

(10) Patent No.: US 12,315,008 B2
(45) Date of Patent: May 27, 2025

(54) AUTHENTICATION OF DATA ENTRIES STORED ACROSS INDEPENDENT LEDGERS OF A SHARED PERMISSIONED DATABASE

(71) Applicant: Baton Systems, Inc., Fremont, CA (US)

(72) Inventors: Arjun Jayaram, Fremont, CA (US); Saurabh Srivastava, San Ramon, CA (US); Mohammad Taha Abidi, San Ramon, CA (US)

(73) Assignee: Baton Systems, Inc., Fremont, CA (US)

( * ) Notice: Subject to any disclaimer, the term of this patent is extended or adjusted under 35 U.S.C. 154(b) by 198 days.

(21) Appl. No.: 17/933,444

(22) Filed: Sep. 19, 2022

(65) Prior Publication Data

US 2023/0087478 A1 Mar. 23, 2023

Related U.S. Application Data

(60) Provisional application No. 63/245,670, filed on Sep. 17, 2021.

(51) Int. Cl.
*G06F 16/00* (2019.01)
*G06F 16/23* (2019.01)
*G06Q 40/04* (2012.01)

(52) U.S. Cl.
CPC ......... *G06Q 40/04* (2013.01); *G06F 16/2365* (2019.01); *G06Q 2220/00* (2013.01)

(58) Field of Classification Search
CPC . G06Q 40/04; G06Q 2220/00; G06F 16/2365
See application file for complete search history.

(56) References Cited

U.S. PATENT DOCUMENTS

| 10,880,105 | B1 * | 12/2020 | Li ......................... G06Q 40/12 |
| 11,861,619 | B1 * | 1/2024 | Vijayaraghavan ... G06Q 20/389 |
| 2019/0354968 | A1 | 11/2019 | Sato et al. |
| 2021/0243272 | A1 | 8/2021 | Diesch et al. |
| 2021/0271681 | A1 | 9/2021 | Jayaram et al. |

OTHER PUBLICATIONS

ISA/US, International Search Report and Written Opinion Received from PCT Application No. PCT/US22/76674, Mailed Date: Jan. 31, 2023, 9 Pages.

* cited by examiner

*Primary Examiner* — Paul Kim
(74) *Attorney, Agent, or Firm* — TechLaw Ventures, PLLC; Terrence J. Edwards

(57) ABSTRACT

Systems, methods, and devices for high-throughput data ingestion from a plurality of disparate and independent sources, and decentralized normalization, storage, and analysis of ingested data. A system includes a shared permissioned ledger comprising a plurality of independent ledger instances. The system includes a processor in communication with the shared permissioned ledger, wherein the processor matches a plurality of data entries stored on the shared permissioned ledger that each pertain to a transaction between a first client and a second client. The processor determines whether each of the plurality of data entries agree with each other to a threshold degree regarding the transaction between the first client and the second client.

25 Claims, 18 Drawing Sheets

AUTHENTICATION OF DATA ENTRIES STORED ACROSS INDEPENDENT LEDGERS OF A SHARED PERMISSIONED DATABASE

CROSS-REFERENCE TO RELATED APPLICATIONS

This application claims the benefit of U.S. Provisional patent Application No. 63/245,670, filed Sep. 17, 2021, titled "AUTHENTICATION OF DATA ENTRIES STORED ACROSS INDEPENDENT LEDGERS OF A SHARED PERMISSIONED DATABASE," which is incorporated herein by reference in its entirety, including but not limited to those portions that specifically appear hereinafter, the incorporation by reference being made with the following exception: In the event that any portion of the above-referenced provisional application is inconsistent with this application, this application supersedes the above-referenced provisional application.

TECHNICAL FIELD

The present disclosure relates to authentication of data entries and particularly relates to the generation, storage, and authentication of data entries stored across a shared permissioned database.

BACKGROUND

Numerous industries generate and output data in high volumes that can become unmanageable for ingestion, analysis, and storage. Example industries generating high-volume data entries include, for example, retail industries generating transactional data, financial industries executing trades between parties, and so forth. Traditional systems for data ingestion, analysis, and storage are complicated by processing and storage constraints. These traditional systems experience high latency when different data output nodes provide data at different volume rates over time. In some industries, it can be critical to ingest, assess, and organize enormous sums of data in near real-time.

The systems and methods described herein specifically address the long-felt and complex technical issues experienced by the financial industry. Financial exchange trading has evolved rapidly over recent years and has seen further electronification with increasing variety in trading venues and protocols. Financial exchange intermediation has tilted towards non-bank electronic market-makers, who substitute speed for balance sheet. Activity has gravitated toward dealers' proprietary liquidity pools and away from primary inter-dealer venues. Different banks and trading institutions use algorithms to enhance execution and navigate a fragmented market, albeit in exchange for taking on more market risk themselves. These developments have led to greater market fragmentation and increased risk shifting. The resulting fragmentation of the financial exchange market has made it challenging to assess market conditions at any given point in time.

The fragmentation of the global financial exchange market is fundamentally a technical and computer-centric problem that arises from different institutions using their own internal databases with their own data formatting. These institutions have little understanding of their own real-time liquidity, obligations, and exposures, and have virtually no understanding of other parties' real-time liquidity, obligations, and exposures. Large trades typically funnel through a central bank, which serves as an intermediary for transferring assets between entities. However, these trades take several days to settle, and the trading parties take on significant risk because they do not understand their real-time liquidity, obligations, and exposures throughout the trading period.

It is important for trading parties to ingest, assess, and organize incoming data in near real-time. In traditional transactional systems, settling a transaction between two or more counterparties can take several days because each of the two or more counterparties must analyze large sums of data to determine their obligations and exposures before settling the transaction. The delay in executing transactions between counterparties is associated with the latency in processing and storage resources for assessing incoming, up-to-date transactional data. Additionally, most transactions can only be executed during business hours when various entities such as banks, clearinghouses, and exchanges are open and operating. This is due at least in part to the individualized data analysis performed by the counterparties.

What is needed are decentralized data ingestion with decentralized analysis and storage resources for multiple parties that cannot share data for security reasons but must coordinate actions based on data analysis. In light of the foregoing, disclosed herein are systems, methods, and devices for near real-time analysis of information consumed by high-throughput data ingestion. Additionally, disclosed herein are systems, methods, and devices for partitioning data in a database for secured, permissioned access such that the data can be assessed by independent nodes for coordinating actions between parties.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
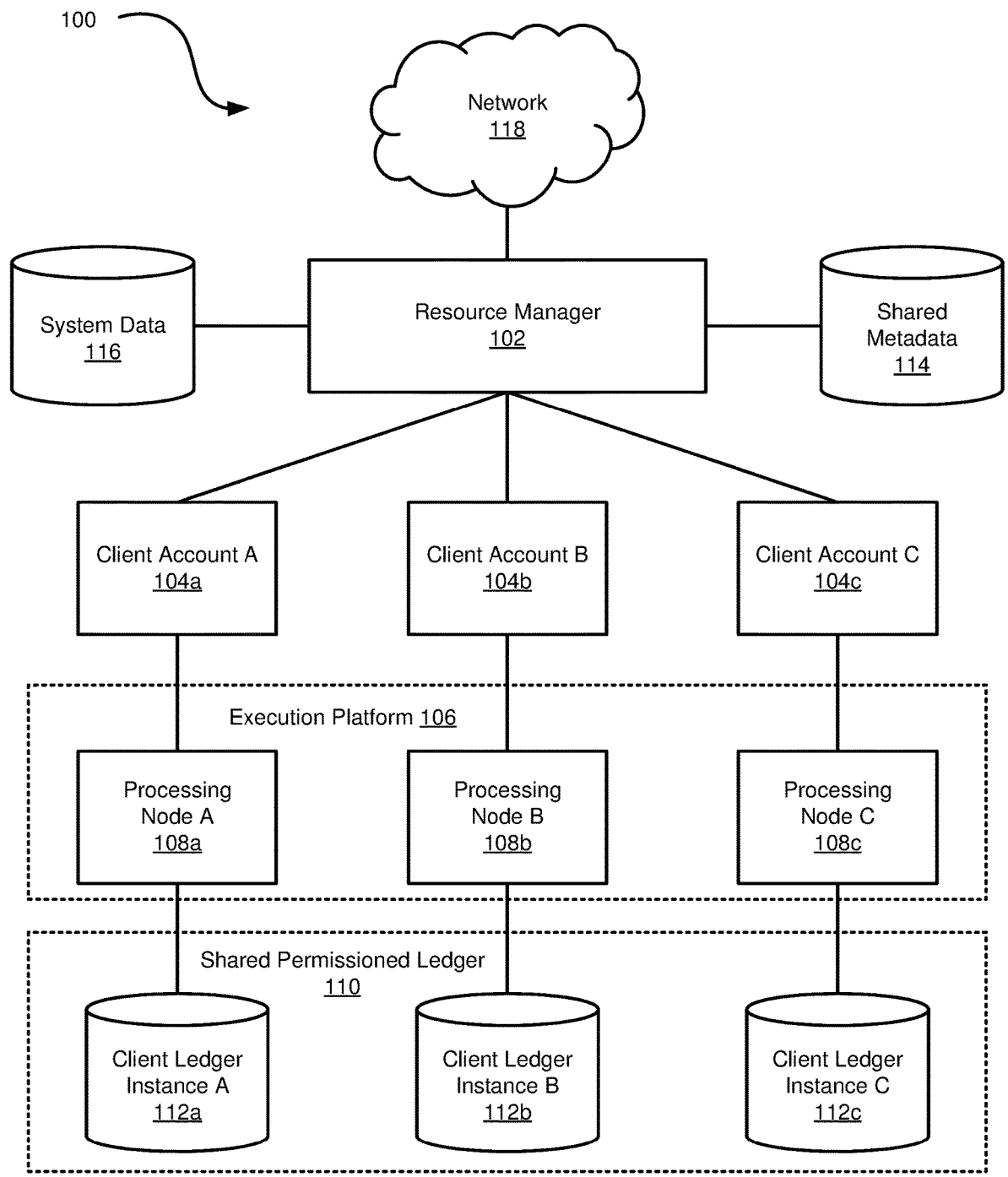
FIGS. 1A and 1B are schematic block diagrams of a system for data management, permissioned access to database entries, and load-balancing of processing resources.

Disclosed herein are systems, methods, and devices for decentralized data ingestion with decentralized data analysis and storage. The systems, methods, and devices disclosed herein leverage scalable processing and storage resources for near real-time analysis of enormous sums of data consumed by high-throughput data ingestion. The consumed data is analyzed in near real-time to calculate metrics for a plurality of unrelated entities such that the unrelated entities can make informed decisions based on up-to-date data analysis. Additionally, the consumed data is normalized, partitioned, and replicated across multiple ledger instances of a shared permissioned ledger such that the unrelated parties can query their own ledger instances to read their own data while ensuring their data is not accessible to other parties without express authorization.

The systems, methods, and devices disclosed herein can be implemented to settle near real-time asset movement between unrelated entities. These near real-time movements are implemented without the use of central repositories that may slow the process and increase the need for on-hand liquidity. Disclosed herein is an electronic notary in communication with a shared permissioned ledger, wherein the shared permissioned ledger provides hashed data entries to the electronic notary for real-time authentication of the data entries. The authentication by the electronic notary enables asset movements to be settled without the use of central repositories.

The systems, methods, and devices disclosed herein reduce latency in data analysis and database management systems by leveraging independent scalability of processing and storage resources. Additionally, the systems, methods, and devices disclosed herein enable efficient, low-latency ingestion of enormous sums of data from multiple source-nodes, wherein the data can be ingested in different proprietary formats and normalized into a standard canonical format being stored across independent database ledger instances. The data ingestion, normalization, and analysis can be executed by dedicated, node-specific ingestion, normalization, and analysis nodes for each incoming data channel. The processing and storage resources for the node-specific ingestion, normalization, and analysis nodes can be scaled up and down across the system based on need.

The systems, methods, and devices disclosed herein can be implemented in a trade management system, although it should be appreciated that the disclosures presented herein represent computer-based improvements applicable to numerous industries. Specifically, the systems and methods described herein can be implemented in a distributed trading platform for tracking, managing, and executing transactions between parties based on real-time liquidity metrics. The computer-centric improvements described herein allow for nearly instantaneous transaction settlement between parties.

Existing financial institutions maintain account information and asset transfer details in a private ledger at the financial institution. The private ledgers at different financial institutions do not communicate with one another and often use different data storage formats or protocols. Thus, each financial institution can only access its own private ledger and has no assurances of the liquidity or obligations of another financial institution, even if the two financial institutions implement a common asset transfer. The systems, methods, and devices described herein enable improvements to computer technology that enable financial institutions to quickly clear transactions without sacrificing data integrity.

In some implementations, problems exist in cleared markets, such as cleared and OTC/bilateral clearing and settlements. In a particular example, at T+0, a Central Counterparty Clearing House (CCP) in the United States closes its trading books for a day at approximately 4:00 PM Pacific Time. This allows firms on the West Coast of the United States to close their trading and trade allocations at the end of the day. The CCP then runs a compute cycle to determine the initial margins and variation margins that need to be applied for the FCMs. At T+1, the computed amounts are applied on the next morning between 6:00-9:00 AM Central Time. The CCPs have debit authorization from the FCMs. If the FCMs owe initial margins or variation margins to the CCPS, the amounts are auto debited by the CCP in cash from the accounts at the settlement banks. An initial margin is, for example, a percentage of a purchase price of a securing. A variation margin is, for example, an adjustment based on price fluctuations of the security. CCPs accept initial margins in cash or securities, subject to haircuts and concentration risks by asset type. Futures clearing merchants may prefer to pay in securities rather than cash because cash is limited, most liquid, and can be used to meet other payment obligations. CCPs will typically auto-debit cash when the FCMs owe initial margins.

Further to the above example, the FCMs pledge securities to get the cash back. At this point, the FCMs are prefunding on behalf of clients. In parallel with the previous stem, the FCMs compute the initial margins and the variation margins that need to be pulled and pushed to clients. The FCMs raise initial margin or variation margin calls to client. The clients may be allocated the rest of the day to pay. If a client is excess in the variation margin, the FCM cannot push the excess to the clients until the next day due to Commodity Futures Trading Commission (CFTC) regulations. Clients send the initial margins (in cash or securities) to the FCM throughout the day. At T+2, in the most common situation, the FCMs' books are reconciled and can put the initial margins and variation margins to use. If the client has excess variation margin, the FCM may wire funds to the client.

The situations described above present specific problems. For the FCM, with respect to the prefunding window, the FCM must prefund clients in cash for lengthy periods of time. The FCM would prefer to pay in collateral on T+0 rather than have cash pulled at T+1 at the start of the day and retrieve the cash later in the day following a pledge. The described situations additionally result in suboptimal asset allocation. For example, FCMs typically leave initial margin accounts over-collateralized to reduce the auto debit pulls by the CCP. This is suboptimal because the initial margin accounts can be used to generate yields with securities lending. With respect to clients, the variation margin payments are between 24 and 48 hours late and speeding this process may require CFTC regulatory relief. With respect to CCPs, in the above situations, the CCPs require higher guarantee funds from all participants because there is a risk of default between the time of initial margin computes and the time of the margin pull. The guarantee funds increase the costs for everyone in the ecosystem.

The systems, methods, and devices described herein utilize the resource manager described herein to permit securities and other assets to be moved and cleared without restriction of time windows/cutoffs. The systems and methods described herein work with CCPs, settlement banks, custody banks, and Futures Clearing Merchants (FCMs) to facilitate 24-hour clearing. In some implementations, the systems and methods described herein will not coordinate with central banks Central Securities Depositories (CSDs).

Figure 1B:
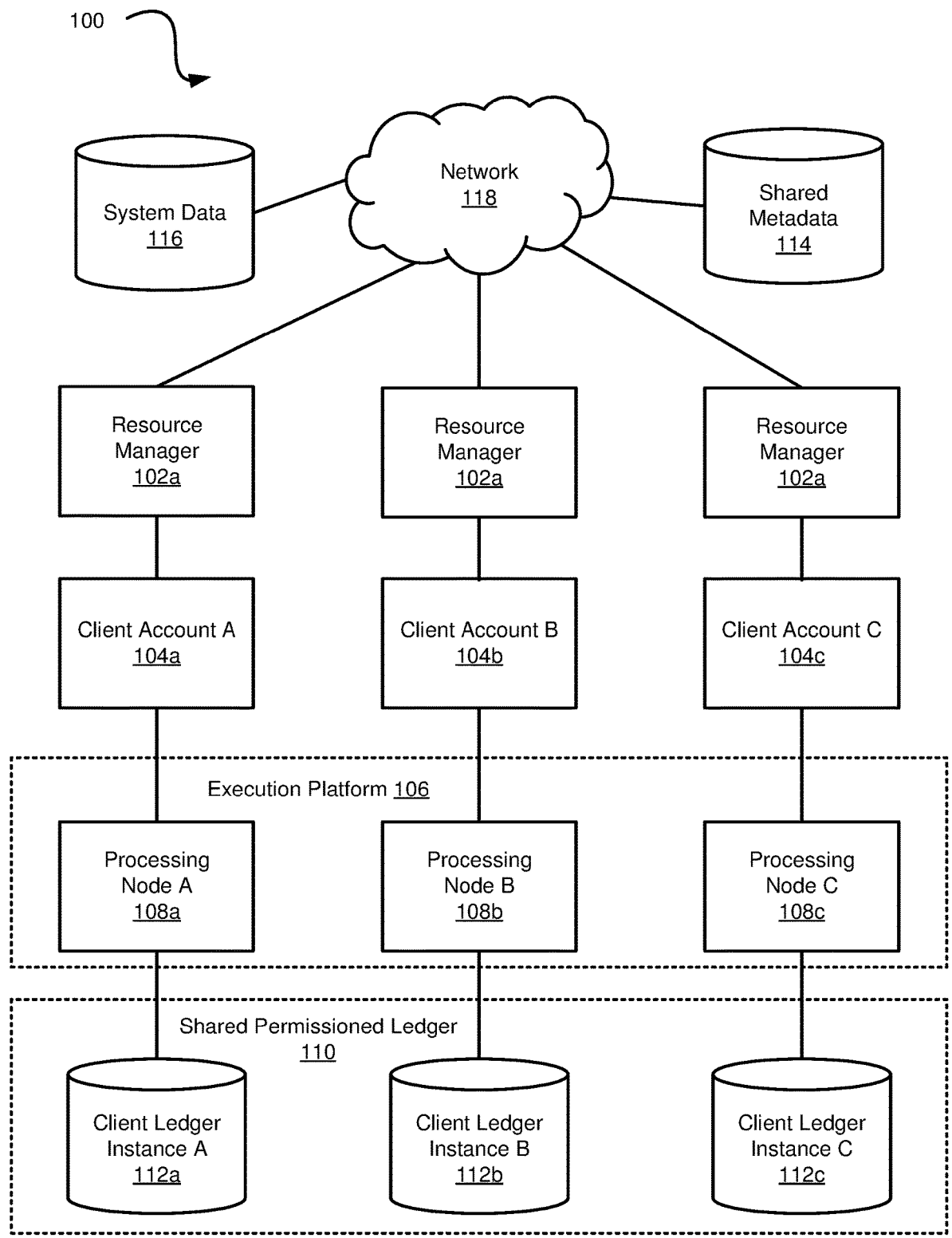

Referring now to the figures, FIGS. 1A-1B are schematic diagrams of varying implementations of a system 100 for data management and permissioned access to database entries. The system 100 includes a resource manager 102 in communication with a network 118. In the example implementation illustrated in FIG. 1A, the system 100 includes a centralized resource manager 102 in communication with each of a plurality of client accounts 104a-104c. In the example implementation illustrated in FIG. 1B, the system 100 includes decentralized and dedicated resource managers 102a-102c (may collectively be referred to as resource manager 102 herein) for each of the client accounts 104a-104c. Any of the systems, methods, and devices described herein may be implemented with a centralized resource manager 102 as shown in FIG. 1A or decentralized resource managers 102 as shown in FIG. 1B.

The resource manager 102 oversees data ingestion and data management for a plurality of client accounts 104, such as client account A 104a, client account B 104b, and client account C 104c (may generically be referred to as client account 104). The client accounts 104 may include different financial institutions, such as central banks, retail banks, commercial banks, internet banks, credit unions, savings and loan associations, investment banks, investment companies, brokerage firms, insurance companies, or mortgage companies. The client accounts may further include other financial entities, such as clearinghouses or exchanges.

The resource manager 102 is executed by an execution platform 106 that includes a plurality of processing nodes 108 associated with the client accounts 104. The client accounts 104 may share the processing resources of the execution platform 106 and/or may be assigned independent processing resources. FIG. 1 illustrates a plurality of processing nodes within the execution platform 106, including processing node A 108a, processing node B 108b, and processing node C 108c. In most implementations, each client account 104 will have a dedicated processing node 108, such that processing resources are not shared across the client accounts 104. This increases data security and ensures the client accounts 104 do not have any visibility into data for other client accounts 104.

The resource manager 102 manages the ingestion, normalization, organization, and storage of data entries within the shared permissioned ledger 110. The shared permissioned ledger 110 includes data entries pertaining to transactions associated with the client accounts 104. The client accounts 104 have secure, permissioned access to data entries based on permissions stored in shared metadata 114. The shared permissioned ledger 110 includes data entries stored across a plurality of ledger instances, including, for example, client ledger instance A 112a, client ledger instance B 112b, and client ledger instance C 112c (may generally be referred to herein as client ledger instance 112). It should be appreciated that the resource manager 102 may be in communication with any number of client accounts 104, processing nodes 108, and client ledger instances 112.

The resource manager 102 detects and records all client metadata on the shared metadata 114 store. This creates an audit trail for the client metadata. Trade data is not stored on the shared metadata 114 store and is instead stored on the shared permissioned ledger 110. The shared metadata 114 store includes information about, for example, the life cycles of accounts, thresholds defined by client accounts 104, rules-based triggers defined by client accounts 104 and/or the resource manager 102, bank accounts, financial institution identifiers, currency data, market data, and so forth.

In an embodiment, the shared metadata 114 only stores data that is marked to be shared publicly between client accounts 104. The shared metadata 114 store includes, for example, name and public identifier of the client account 104 along with other identifiers the client account 104 might utilize on incoming trade data. The shared metadata 114 store may be implemented as a common store that is stored separately from the shared permissioned leger 110 and the client ledger instances 112. The shared metadata 114 store serves as a directory service to provide lookups for identifying participants.

The shared permissioned ledger 110 stores data in partitions that can be queried by the resource manager 102. The data entries in the shared permissioned ledger 110 are immutable such that entries cannot be deleted or modified and can only be replaced by storing a new, superseding data entry. The data stored in the shared permissioned ledger 110 is auditable. In particular implementations, the shared permissioned ledger 110 is an append only data store which keeps track of all intermediate states of the transactions. Additional metadata may be stored along with the transaction data for referencing information available in external systems. In specific embodiments, the shared permissioned ledger 110 may be contained within a financial institution or other system. The shared permissioned ledger 110 is not distributed across a blockchain network.

In an implementation, the shared permissioned ledger 110 stores data entries comprising transaction information for client accounts and outside entities. The shared permissioned ledger 110 includes an independent client ledger instance 110 associated with each client account. The independent client ledger instances 110 include separate and unique hardware for storing ledger data entries. In an embodiment, the shared permissioned ledger 110 includes scalable storage hardware that can be partitioned to client ledger instances 112 based on need. The resource manager 102 allocates additional storage space within the shared permissioned ledger 110 based on which client account 104 requires additional storage. The storage space within the shared permissioned ledger 110 is independently scalable of the processing resources within the execution platform 106. This enables numerous benefits and ensures each client account 104 has access to sufficient processing resources and storage resources based on need.

The independent client ledger instances 112 store different versions of the shared permissioned ledger 110 based on the permissions for the corresponding client account. The shared permissioned ledger 110 holistically stores transaction state information for all transactions requested, pending, and settled by all entities within the system's 100 network of client accounts 104. However, different versions of the shared permissioned ledger 110 are stored on the independent client ledger instances 112 based on need. In an embodiment, the system 100 does not include a single, centralized copy of all data entries within the shared permissioned ledger 110. Instead, the data entries within the shared permissioned ledger 110 are dispersed amongst the client ledger instances 112 based on client account permissions stored in shared metadata 114. Each client account 104 has access only to the client ledger instance 112 associated with that client account. For example, client account A only has access to data entries stored on client ledger instance A; client account B only has access to data stored on client ledger instance B; and client account C only has access to data entries stored on client ledger instance C. The resource manager 102 manages access to the data entries stored on the client ledger instances and ensures, for example, that processing node A cannot read or write to the client ledger instance C.

The shared permissioned ledger 110 is modeled after double-entry accounting principles. When a transaction is initiated between counterparties, at least two data entries are stored on the shared permissioned ledger 110, including a first data entry stored on a first client ledger instance associated with the first party to the transaction, and a second data entry stored on a second client ledger instance associated with the second party to the transaction. The first data entry and the second data entry are not necessarily duplicates of one another and may include different information that is applicable to the corresponding party to the transaction. In some cases, the first data entry and the second data entry are duplicates of one another. Nevertheless, the processing node associated with the first party cannot read the second data entry stored on the client ledger instance associated with the second party. The first party does not have permissions to query, read, or write to the client ledger instance associated with the second party (and vice versa).

In some cases, the resource manager 102 causes only one data entry (with no duplicate) to be stored on one client ledger instance of the shared permissioned ledger 110. This occurs when the content of the data entry is applicable to only one client account. For example, if a first party to a transaction has completed an internal review of a transaction, cleared funds for the transaction, etc., and this update does not involve the second party to the transaction, then the resource manager 102 may cause a data entry to be stored on the client ledger instance associated with the first party that includes the applicable information. In this case, the resource manager 102 does not cause a duplicate data entry to be stored on the client ledger instance associated with the second party to the transaction because the second party does not have permission to view the applicable information and/or the applicable information is not relevant to the second party. As part of the normalization process, the resource manager 102 identifies the principles of a trade. The trades are replicated and stored on all participant client ledger instances 112. Generally, incoming data is stored to the client ledger instances 112 of all participants to the trade.

The shared permissioned ledger 110 stores an auditable trail of financial transaction data. A data entry comprising financial transaction data includes one or more of data related to the principal parties to the transaction, a transaction date, a transaction amount, a transaction state (e.g., initiated, pending, cleared, settled), relevant workflow references, a trade ID, a transaction ID, and additional metadata to associate the transaction(s) with one or external systems. The data entries stored on the shared permissioned ledger 110 include cryptographic hashes to provide tamper resistance and auditability.

The system 100 allows for selective replication of data stored on the shared permissioned ledger 110. The resource manager 102 can permit an outside entity (e.g., a bank, financial institution, clearinghouse, exchange, and so forth) to replicate certain data entries stored on the shared permissioned ledger 110. The resource manager 102 does not allow any outside party to query, read, or write to any data stored on a client ledger instance without receiving express authorization. In an example implementation, client account A wishes to release certain data entries to an outside party. Client account A communicates with the resource manager 102 and indicates that the resource manager 102 should permit the outside party to query, read, and/or write to the certain data entries. The resource manager 102 then grants the outside party access to the certain data entries stored on the client ledger instance A.

The processing nodes 108 for each client account can calculate the overall obligations, exposures, and liquidity for that client account in real-time based on data stored on the shared permissioned ledger 110. The resource manager 102 is notified when a trade is initiated and generates an auditable trail of data entries for the lifetime of that trade. The resource manager 102 causes data entries to be stored on the shared permissioned ledger 110 whenever the trade undergoes a state change. The processing nodes 108 can reference the shared permissioned ledger to calculate the obligations, exposures, and liquidity of a client account in real-time because current transaction information is continually stored on the shared permissioned ledger 110.

The network 118 includes any type of network, such as a local area network, a wide area network, the Internet, a cellular communication network, or any combination of two or more communication networks. The resource manager 102 communicates with some client accounts 104 and outside parties by way of communication protocols such as SWIFT MT (Society for Worldwide Interbank Financial Telecommunication Message Type) messages (such as MT 2XX, 5XX, 9XX), ISO 9022 (a standard for electronic data interchange between financial institutions), and proprietary application interfaces. The resource manager 102 ingests data and receives communications from client accounts 104 (and entities associated with the client accounts 104) using secure APIs (Application Program Interfaces) and other protocols. The resource manager 102 can integrate with existing financial institutions, banks, clearinghouses, and exchanges without significant modification to the institution's systems.

In an implementation, the resource manager 102 oversees and manages trades between client accounts 104 and outside parties. Because the resource manager 102 is in communication with the shared permissioned ledger 110, the resource manager 102 can calculate liquidity and overall obligations and exposures for each of the client accounts 104 in real-time. This enables the resource manager 102 to settle financial transactions even when exchanges and clearinghouses are closed. Thus, the resource manager 102 can execute a financial transaction nearly immediately upon receiving a request to execute the transaction. This represents a significant improvement over traditional trading systems, wherein a financial transaction may take several days to settle to ensure the transaction counterparties have sufficient liquidity.

As discussed in greater detail herein, the resource manager 102 manages asset transfers between numerous entities. In many cases, execution of an asset transfer includes the use of a central bank to clear and settle the funds. The central bank provides financial services for a country's government and commercial banking system. In the United States, the central bank is the Federal Reserve Bank. In some implementations, resource manager 102 provides an on-demand gateway integrated into the heterogeneous core ledgers of financial institutions (e.g., banks) to view funds and clear and settle all asset classes. The resource manager 102 may also settle funds using existing services such as FedWire.

The resource manager 102 communicates with authorized systems and authorized users. The authorized set of systems and users often reside outside the jurisdiction of the resource manager 102. Typically, interactions with these systems and users are performed via secured channels such as SWIFT messaging and/or secure APIs. To ensure the integrity of the resource manager 102, various constructs are used to provide system/platform integrity as well as data integrity.

In an embodiment, the system data 116 database stores a listing of authorized machines, devices, and accounts (i.e., "whitelisted"). The resource manager 102 accesses the system data 116 to determine whether a user is authorized, and what data that user is authorized to access. The resource manager 102 verifies the identity of each machine using security certificates and cryptographic keys. The resource manager 102 securely communicates with outside parties by way of secure API access points. The resource manager 102 stores a listing of authorized users and roles, which may include actual users, systems, devices, or applications that are authorized to interact with resource manager 102 and/or access certain data stored on the shared permissioned ledger 110. System/platform integrity is also provided through the use of secure channels to communicate between resource manager 102 and external systems. In some embodiments, communication between the resource manager 102 and external systems is performed using highly secure TLS (Transport Layer Security) with well-established handshakes between the resource manager 102 and the external systems. Particular implementations may use dedicated virtual private clouds (VPCs) for communication between the resource manager 102 and any external systems. Dedicated VPCs offer clients the ability to set up their own security and rules for accessing resource manager 102. In some situations, an external system or user may use the DirectConnect network service for better service-level agreements and security.

The resource manager 102 allows each client account 104 to configure and leverage their own authentication systems. This allows clients to establish custom policies on user identity verification, including two-factor authentication, and account verification. An authentication layer within the resource manager 102 delegates requests to client systems and allows the resource manager 102 to communicate with multiple client authentication mechanisms.

The resource manager 102 supports role-based access control of workflows and the actions associated with workflows. Example workflows may include Payment vs Payment (PVP) and Delivery vs Payment (DVP) workflows. In some embodiments, users can customize a workflow to add custom steps to integrate with external systems that can trigger a change in transaction state or associate them with manual steps. Additionally, system developers can develop custom workflows to support new business processes. In particular implementations, some of the actions performed by a workflow can be manual approvals, a SWIFT message request/response, scheduled or time-based actions, and the like. In some embodiments, roles can be assigned to particular users and access control lists can be applied to roles. An access control list controls access to actions and operations on entities within a network. This approach provides a hierarchical way of assigning privileges to users. A set of roles also includes roles related to replication of data, which allows the resource manager 102 to identify what data can be replicated and who is the authorized user to be receiving the data from an external system.

Additionally, one or more rules identify anomalies which may trigger a manual intervention by a user or principal to resolve the issue. Example anomalies include system request patterns that are not expected, such as a high number of failed login attempts, password resets, invalid certificates, volume of requests, excessive timeouts, http errors, and the like. Anomalies may also include data request patterns that are not expected, such as first time use of an account number, significantly larger than normal number of payments being requested, attempts to move funds from an account just added, and the like. When an anomaly is triggered, the resource manager 102 is capable of taking a set of actions. The set of actions may initially be limited to pausing the action, notifying the principals of the anomaly, and only resuming activity upon approval from a principal.

Figure 2:
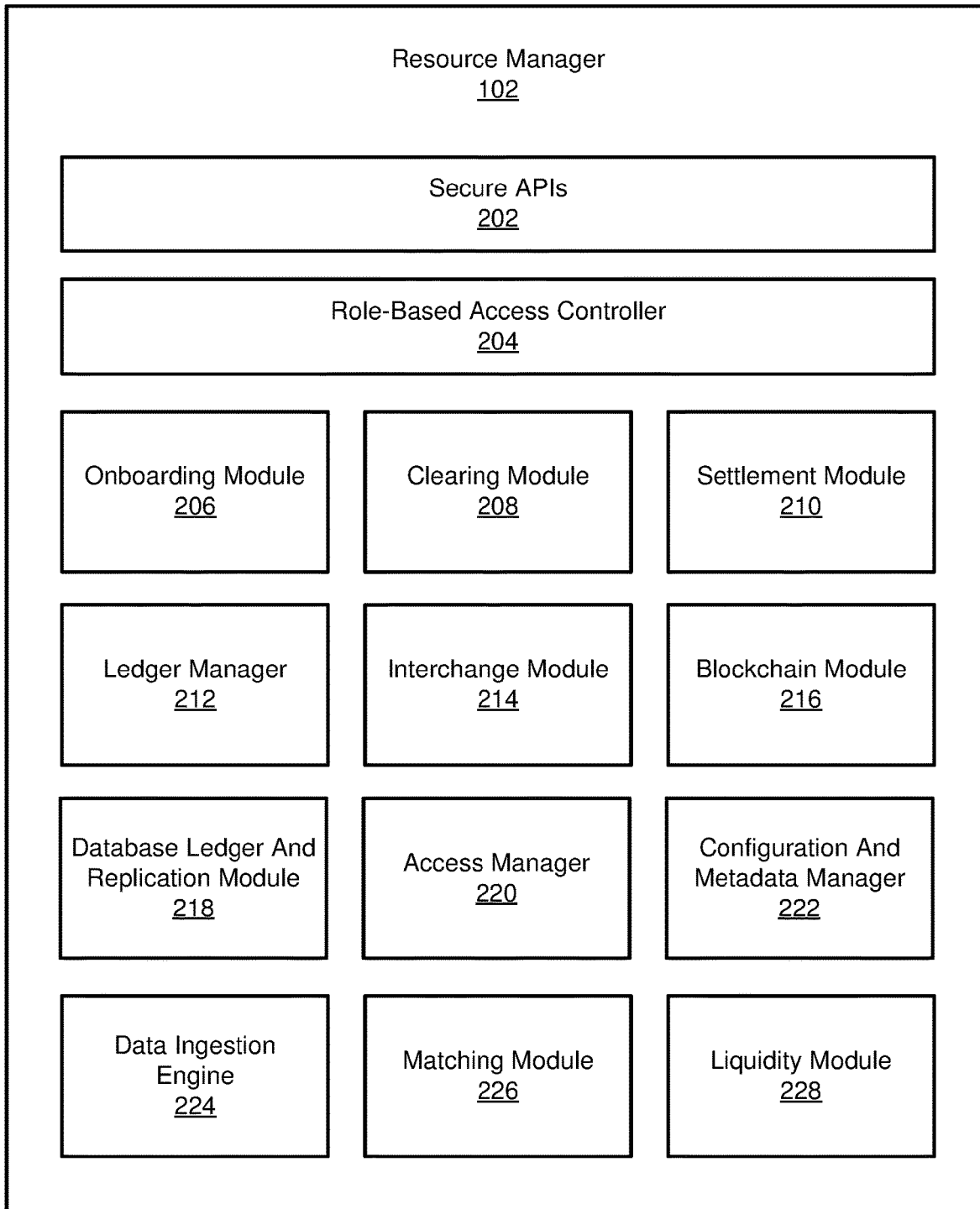
FIG. 2 is a schematic block diagram illustrating example components, modules, and functionality of a resource manager as described herein.

FIG. 2 is a schematic block diagram illustrating example modules and functionalities of the resource manager 102. In an implementation wherein the resource manager 102 oversees and manages financial transactions for certain parties, the resource manager 102 can communicate directly with one or more Central Counterpart Clearing Houses (CCPs), exchanges, banks, asset managers, hedge funds, or data ingestion engines. CCPs are organizations that facilitate trading in various financial markets. Exchanges are marketplaces in which securities, commodities, derivatives, and other financial instruments are traded. Banks include any type of bank, credit union, savings and loan, or other financial institution. Asset managers include asset management organizations, asset management systems, and the like. In addition to hedge funds, the resource manager 102 may also communicate with other types of funds, such as mutual funds. The resource manager 102 communicates with CCPS, exchanges, banks, asset managers, and hedge funds using a suitable and secure communication network and communication protocol.

The resource manager 102 includes secure APIs 202 that are used by partners to securely communicate with the resource manager 102. In some embodiments, the secure APIs 202 are stateless to allow for automatic scaling and load balancing. The resource manager 102 scales based on numerous factors, including the rate of incoming requests and the time of day to correspond with settlement and cutoff windows. During higher rates, services scale up to provide larger capacity for the processing nodes 108 to process the requests for their respective client accounts 104. The resource manager 102 load balances the request across the processing nodes 108 and client ledger instances 112 to ensure no individual instance is overlooked. When the rate returns to normal, the resource manager 102 scales down to keep optimum usage of resources and cost.

The role-based access controller 204 provide access to modules, data, and activities based on the roles of an individual user or participant interacting with the resource manager 102. In some embodiments, users belong to roles that are given permissions to perform certain actions. The resource manager 102 may receive an API request and check the API request against the role to determine whether the user has permissions to perform an action.

The onboarding module 206 includes the metadata associated with a particular financial institution, such as bank account information, user information, roles, permissions, settlement groups, assets, and supported workflows. The onboarding module 206 includes functionality for authenticating ownership of a bank account or other account.

The clearing module 208 includes functionality to transfer assets between accounts within a financial institution. As used herein, DCC refers to a direct clearing client or an individual or institution that owes an obligation. A payee refers to an individual or institution that is owed an obligation. A CCG (or Guarantor) refers to a client clearing guarantor or an institution that guarantees the payment of an obligation. A CCP refers to a central counterparty clearinghouse and a Client is a customer of the FCM (Futures Clearing Merchant or Futures Commission Merchant)/CCG guarantor. Collateral settlements refer to non-cash-based assets that are cleared and settled between CCP, FCM/CCG guarantor, and DCC. CSW refers to collateral substitution workflow, which is a workflow used for the pledging and recall (including substitution) of collateral for cash. A settlement group refers to a logical grouping of stakeholders who are members of that settlement group that are involved in the clearing and settlement of one or more asset types. A workflow, when executed, facilitates a sequence of clearing and settlement instructions between members of a settlement group as specified by the workflow parameters.

The settlement module 210 monitors and manages the settlement of funds or other types of assets associated with one or more transactions handled by the resource manager 102. Settlement execution includes executing a complex workflow for managing data and asset transfers between parties.

The resource manager 102 and the system 100 provide a unique improvement to computer-based communications and data storage that can be leveraged particularly in the financial transaction industry for (a) increasing the speed with which transactions can be executed; (b) increasing the reliability of liquidity metrics; (c) increasing the reliability of risk metrics; and (d) enabling the obligations and exposures of parties to be calculated in near real-time based on incoming data streams. Because of the structure of the system 100, the settlement module 210 of the resource manager 102 is capable of initiating bidirectional movement of assets in capital markets. The settlement module 210 can finalize a transaction within minutes, and in some cases as quickly as two minutes. This is a significant improvement over traditional systems, which require 24-48 hours to fully settle a transaction. This significant increase in settlement type is enabled by the structure of the system 100 and the communications the resource manager 102 has with outside parties, client accounts, client processing nodes, and the shared permissioned ledger 110.

In some implementations, the settlement module 210 operates under a number of rule-based triggers to initiate settlements based on certain circumstances. For example, the settlement module 210 may include a rule-based trigger to initiate all pending, valid settlements one-hour before cutoff time for an exchange. The rule-based triggers for the settlement module 210 can be automated, manually configured, and/or suggested by a neural network that is trained to predict risk and suggest settlement triggers based on the predicted risk.

The settlement module 210 enables authorized users to execute complex workflows to enable institutions to move assets on demand. The settlement module 210 may additionally allow one or more third parties to view and confirm payment activities between parties. The settlement module 210 enables on-demand settlements across multiple parties based on near real-time liquidity analysis, even when markets are closed.

A workflow describes the sequence of activities associated with a particular transaction, such as an asset transfer. The settlement module 210 provides a clearing and settlement gateway between multiple entities, e.g., different banks, mutual funds, hedge funds, and so forth. When a workflow is executed, the settlement module 210 generates and issues clearing and settlement messages (or instructions) to facilitate the movement of assets. The shared permissioned ledger 110 tracks asset movement and provides visibility to the parties and observers in substantially real time. The integrity of these systems and methods is important because the systems are dealing with core payments that are a critical part of banking operations. Additionally, many asset movements are final and irreversible. Therefore, the authenticity of the request and the accuracy of the instructions are crucial. Further, reconciliation of transactions between multiple parties are important to the management of financial data.

Payments between parties can be performed using multiple asset types, including, for example, currencies, treasuries, securities such as notes, bonds, bills, and equities, and the like. Payments can be made for different reasons, such as margin movements, collateral pledging, swaps, delivery, fees, liquidation proceeds, and the like. As discussed herein, each payment may be associated with one or more metadata.

The settlement module 210 may additionally trigger reconciliation and regulatory reporting for executed trades. In capital markets, asset movement is triggered due to a settlement on a set of trades between parties. All parties involved in the trade, as well as the clearing and settlement of the trade, need to perform post-trade activities that include reconciliation and regulatory reporting of the trades as well as the payments associated with the trades. In traditional systems, reconciliation and regulatory reporting is a significant pain point for operations teams because it is mostly manual and labor intensive. The main problems related to reconciliation and the regulatory reporting are the heterogeneous systems that are involved in traditional transaction data systems. The settlement module 210 provides a platform to move assets as part of settlement, and this enables the capture of trade level information that results in asset movement (i.e., settlement). When this functionality is extended to participants managed by the resource manager 102, the reconciliation efforts can be minimized as participants can use the shared and permissioned features of the shared permissioned ledger 110 to generate the reconciliation and regulatory reports.

In many implementations, the number of trade events that occur in a day is three to five orders of magnitude greater than the number of settlements that occur in a day. The settlement module 210 captures the trade events and determines if a trade has been completed or fully settled. This simplifies the reconciliation and regulatory reporting problems experienced by institutions, users, and the like.

The ledger manager 212 manages the shared permissioned ledger 110. Traditional financial institutions typically maintain account information and asset transfer details in a ledger at the financial institution. The ledgers at different financial institutions do not communicate with one another and often use different data storage formats or protocols. Thus, each financial institution can only access its own ledger and cannot see data in another financial institution's ledger, even if the two financial institutions implemented a common asset transfer. The shared permissioned ledger 110 described herein enables secure coordination between principals based on near real-time liquidity metrics without sacrificing data security.

The shared permissioned ledger 110 includes distributed ledger technology (DLT) in a database format that is spread across multiple systems or sites, such as different institutions and/or different geographic areas. In contrast with traditional distributed ledger technology (e.g., Blockchains), data stored on the shared permissioned ledger 110 described herein cannot be accessed by all parties and is not replicated by each party. The shared permissioned ledger 110 described herein is replicated only, when necessary, for more than one party to access the information, e.g., when both counterparties to a transaction require a copy of the same information. Other entities who are not a party to the transaction do not have access to that information. The ledger manager 212 oversees the organization, replication, and access to data entries stored across the plurality of client ledger instances of the shared permissioned ledger.

The interchange module 214 communicates with outside parties and facilitates transaction settlement. The interchange module 214 may communicate by way of FedWire, NSS (National Settlement Service), ACH (Automated Clearing House), or other suitable means of communication and transaction settlement. In most jurisdictions, all bank accounts are associated with an account on a federal or national level. In the United States, banks each have an account with the Federal Reserve. When two or more accounts at the same bank seek to trade assets, the trade is easy to execute. However, when two or more accounts at different banks seek to trade assets, the trade settlement is more complex, because assets must be debited from an account at the first bank and transferred to an account at the second bank. The Federal Reserve serves as the "bank of banks," wherein all banks have an account at the Federal Reserve. The process of moving assets by debiting money from the first bank includes moving the money to the first bank's account at the Federal Reserve, and then crediting the second bank's account at the Federal Reserve, and the crediting the account at the second bank. The interchange module 214 communicates with outside parties for executing transactions between banks.

The blockchain module 216 provides interoperability with blockchains for settlement of assets on a blockchain.

When some financial transactions undergo a state change (e.g., initiated—pending—approved—cleared—settled, etc.) it may trigger one or more notifications to the parties involved in the transaction. The systems and methods described herein provide multiple ways to receive and respond to these notifications. In some embodiments, these notifications can be viewed and acknowledged using a dashboard associated with the described systems and methods or using one or more APIs.

The database ledger and replication module 218 exposes constructs of the shared permissioned ledger 110 to the resource manager 102. The database ledger and replication module 218 stores immutable transaction states on the shared permissioned ledger 110 such that the transaction states, and the history of a transaction, can be audited by querying the shared permissioned ledger 110. The database ledger and replication module 218 oversees the replication and authorized read/write of data entries stored on the shared permissioned ledger 110.

The access manager 220 monitors permissions to data stored on the shared permissioned ledger 110 and elsewhere throughout the system 100. In some cases, an outsider who is not a party to a transaction may need access to information about the transaction. The outsider may be granted "observer" status to information about the transaction. The observer may be a stakeholder in a transaction or may be involved in the execution of clearing or settling the transaction. The access manager 220 permits an authorized observer to subscribe to a subset of notifications associated with a transaction. The access manager 220 may grant access upon receiving authorization from one or more parties to the transaction who agree the observer can receive the subset of notifications.

The configuration and metadata manager 222 oversees and directs the storage of metadata and trade data across the shared metadata 114 database and the shared permissioned ledger 110.

The resource manager 102 includes or communicates with a data ingestion engine 224. The data ingestion engine 224 includes at least one data ingestion platform that consumes transaction data in real-time along with associated events and related metadata. The data ingestion engine 224 is a high throughput pipe that provides an ability to ingest transaction data in multiple formats. The resource manager 102 normalizes the ingested data to a canonical format. The normalized data is used by downstream engines like the matching module 226, liquidity module 228, optimizers, netting modules, real-time count modules, and so forth.

The matching module 226 is a real-time streaming processor. The matching module 226 identifies multiple data entries and/or transactions that should be stitched together as multiple components of a single trade (or another event). In an embodiment, the matching module 226 is a windowed stream processing component. The matching module 226 can read from a normalized data stream (e.g., trade data in FIXML format) and compute the status of the trade orders. FIG. 13 illustrates an example of a schema produced as a stream by the matching module 226.

The matching module 226 can identify data entries associated with multiple transactions of a single trade. In some cases, a single trade is split into multiple smaller "trade-lets," and each trade-let may be executed as a single transaction. It can be important to identify each of the trade-lets, determine whether the trade-lets have been fully executed, and then determine whether the trade is settled based on whether each of the trade-lets has been executed.

An example of parsing a trade into multiple transactions (i.e., trade-lets) is described as follows. In the example, a client initiates a request to purchase 10,000 shares of IBM stock with a sell side dealer. The dealer proceeds to execute the order. Often, the order is executed in smaller sizes or lots. The smaller transactions are received by the back-office settlement systems. In this example, assume the order of 10,000 shares is executed in lot sizes of 2,500 shares each. When it is time to settle the trade, the settlement will occur for all of the 10,000 shares (or four executions) at the same time. To ensure the trade settles completely, the system 100 stitches together all of the unique executions. Once stitched together, the system 100 can deem that the trade is ready for settlement.

In some embodiments, the data received by the data ingestion engine 224 is for the executions and not for the complete trade order. The executions will each include a unique trade ID. The multiple executions are identified based on the unique trade ID. In some cases, the retrieval of the multiple executions is a technically complicated process. For example, if the first execution occurred at 10:00 AM and the second execution occurred at 11:00 AM, the chances that the first execution is in memory when the second execution is received are low. The retrieval component of the matching module 226 must determine that the order is not complete when the first execution is received and the system 100 should prepare to receive another execution of the same trade order. The retrieval component additionally determines that the first execution needs to be retrieved from the shared database ledger 110 when the second execution is received. When the second execution is received, the matching module 226 retrieves the first execution from the shared database ledger and stitches the first execution to the second execution. The retrieval component must additionally determine whether the system 100 should expect a third execution.

In some cases, subsequent executions (such as the third and fourth executions in the above example) do not occur. This is deemed a partially executed trade. The resource manager 102 does not leave the trade hanging at the close of the trading day. Instead, the resource manager 102 completes the trade and marks the trade as having been only partially completed.

The liquidity module 228 calculates liquidity in near real-time for parties that push trade data to the data ingestion engine 224 of the resource manager 102. The liquidity module 228 calculates overall obligations and exposures and real-time liquidity for all asset types traded for various parties. In an implementation, the resource manager 102 oversees a plurality of settlement groups, wherein each settlement group is dedicated to a certain asset-type, such as securities, bonds, certain currencies, and so forth. The liquidity demand for a party includes multiple components, including: each counterparty, the asset type being exchanged with each counterparty, and other factors. These components are evaluated each time the liquidity demand is calculated or updated.

In some embodiments, different financial institutions in a distributed environment may have different business rules. For example, a particular business rule for a specific financial institution may state that if a risk exposure exceeds a predetermined threshold value (based on currency, jurisdiction, etc.), the financial institution needs to take action to mitigate its risk, such as generate an alert, force a settlement, open another position with a different counterparty to reduce exposure, and the like.

The liquidity module 228 may additionally calculate risk exposure for various parties. The liquidity module 228 executes a statistical model to predict future obligations and exposures, and calculate predicted risk based on the future obligations and exposures. The liquidity module 228 receives the normalized data from the normalized data channel (first illustrated as 508 in FIG. 5A) and executes the statistical model using data received from the client in near real-time by way of the normalized data channel. The statistical model represents a risk model associated with a particular financial institution. The liquidity module 228 may execute a different statistical model and/or risk model for each client account based on that client's risk tolerances and risk preferences. For example, different financial institutions may use different factors (and apply different weightings to various factors) when determining their own risk tolerance. These factors include, for example, past history with a counterparty, current exposures, current obligations, and the like. Thus, each financial institution's statistical model may generate its own unique risk score.

The liquidity module 228 may apply multiple different statistical models to the same data to achieve multiple risk scores. These multiple risk scores are useful to financial institutions for different types of trades or products. For example, different risk scores may be used for spots versus swaps.

In traditional systems, financial institutions have access to a limited amount of counterparty data because the data is spread across multiple internal systems. The systems described herein, and the processes executed by the resource manager 102, allow financial institutions to obtain a holistic view of data across all currencies, all jurisdictions, all counterparties, all products, and so forth. The liquidity module 228 calculates risk exposure and identifies high-risk counterparties. Thus, a financial institution can identify high-risk counterparties in substantially real time and act, if necessary, to mitigate risk associated with the high-risk counterparties.

The system 100 protects proprietary information across the various client accounts 104 by executing the liquidity module 228 on independent processing nodes 108 assigned to the client accounts 104. The execution platform 106 may comprise a large sum of processing resources that can be scaled up and down to the various client accounts 104 based on need. However, the results of the processing executions are not shared across the client accounts 104. This ensures that client data remains confidential and that counterparties do not have unwanted insight into a client's proprietary operations.

In an example implementation, client account A wishes to mitigate risk when trading assets with client account B and client account C. The resource manager 102 oversees data ingestion, analysis, and storage for each of client account A, client account B, and client account C. Nevertheless, to protect the privacy of all client accounts 104, the resource manager 102 does not permit client account A to view confidential data or analyses associated with client accounts B and C. Instead, the resource manager 102 causes the processing node A (associated with client account A) to execute its own instance of the liquidity module 228 to predict risk associated with client accounts B and C. The liquidity module 228 instance associated with client account A does not have access to confidential information associated with client accounts B and C (even though that information is stored on the shared permissioned ledger 110). The liquidity module 228 must instead predict the risk associated with client accounts B and C based on information "owned" by client account A. This information includes, for example, past interactions with client accounts B and C, predict obligations and exposures associated with client accounts B and C, and known processes or rules associated with client accounts B and C.

The system and platform integrity are important to the secure operation of the resource manager 102. This integrity is maintained by ensuring that all actions are initiated by authorized users or systems. When an action is initiated and the associated data is created, an audit trail of any changes made, and other information related to the action, is recorded on the shared permissioned ledger 110 for future reference. In particular embodiments, the resource manager 102 includes (or interacts with) a roles database and an authentication layer. The roles database stores various roles of the type discussed herein.

Although particular components are shown in FIG. 2, alternate embodiments of resource manager 102 may contain additional components not shown in FIG. 2 or may not contain some components shown in FIG. 2. The resource manager 102 is implemented, at least in part, as a cloud-based system. In other examples, resource manager 102 is implemented, at least on part, in one or more data centers. In some embodiments, some of these modules, components, and systems may be stored in (and/or executed by) multiple different systems. For example, certain modules, components, and systems may be stored in (and/or executed by) one or more financial institutions.

Figure 3:
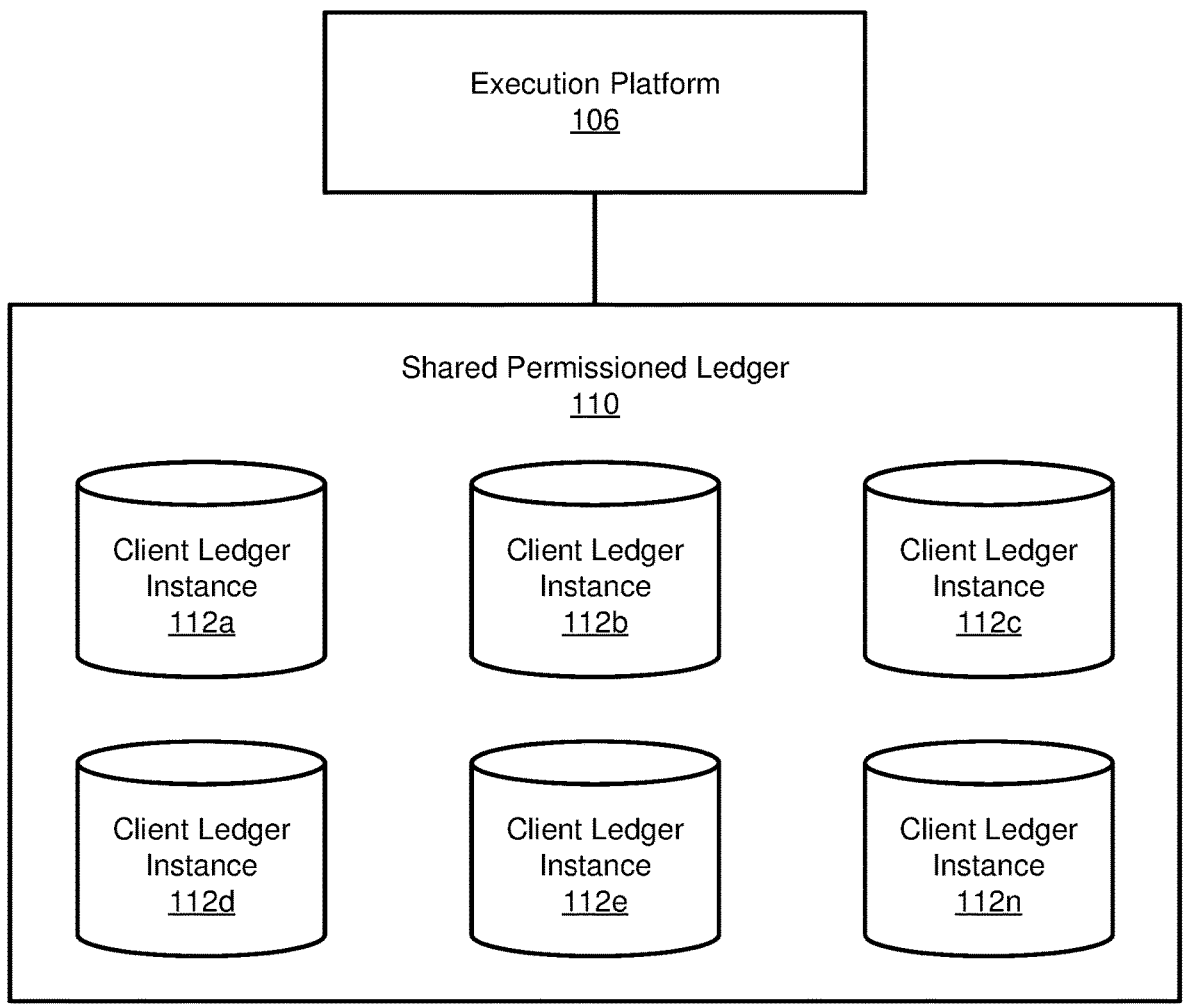
FIG. 3 is a schematic diagram illustrating communication between a resource manager and a shared permissioned ledger comprising a plurality of client ledger instances.

FIG. 3 is a schematic diagram of communications between the execution platform 106 and the shared permissioned ledger 110. The shared permissioned ledger 110 is a database including a plurality of client ledger instances 112, such as client ledger instances 112a-112n illustrated in FIG. 3. Each of the client ledger instances 112 may be stored on independent hardware that is partitioned for a certain client account. In an embodiment, the shared permissioned ledger 110 is stored across a plurality of storage hardware in a cloud-based database system in communication with a network. The storage hardware that is holistically assigned to the shared permissioned ledger 110 may then be partitioned by the execution platform 106 for use by the independent client ledger instances 112.

In an embodiment, the resource manager 102 scales usage of database hardware to each of the client ledger instances 112 based on need. The storage hardware for the shared permissioned ledger 110 is independently scalable from the processing resources of the execution platform 106. The resource manager 102 scales storage and processing resources up and down to each of the client processing nodes and client ledger instances based on need. The resource manager 102 may determine, for example, that one client account needs additional processing resources but does not require additional storage resources at a certain time.

The client ledger instances 112 are partitions of the shared permissioned ledger 110. Each of the client ledger instances 112 may be stored on storage hardware located in one geographical location, and that storage hardware may be in communication with a network 118 to form a cloud-based database platform. Alternatively, the client ledger instances 112 may be stored on storage hardware located in a plurality of geographical locations that collectively make up the shared permissioned ledger 110. Each of the client ledger instances 112 stores a different dataset applicable to a certain client account. The client ledger instances 112 do not store duplicate data, and data stored across the shared permissioned ledger is not shared by different client ledger instances. If a certain data entry needs to be duplicated for two or more client accounts (e.g., when two client accounts are counterparties to a financial transaction and require the same information about the transaction), then the data entry will be duplicated and independently stored on two or more client ledger instances that are associated with the two or more client accounts.

The resource manager 102 manages permissions for the shared permissioned ledger. The resource manager 102 ensures that a client account 104 can only access the data entries stored on that client account's 104 client ledger instance 112. In some cases, the resource manager 102 may grant special permission for a client account 104 or outside party to access data entries that do no "belong" to that party. The resource manager 102 will only grant special permission after receiving express authorization to release the data to the other client account or outside party.

Each transaction can have two or more participants. In addition to the multiple parties involved in the transaction, there can be one or more "observers" to the transaction. The observer status is important from a compliance and governance standpoint. For example, the Federal Reserve or the CFTC is not a participant of the transaction but may have observer rights on certain type of transactions stored on the shared permissioned ledger 110. In some embodiments, the resource manager 102 permits outside observers to subscribe to certain types of events.

The shared permissioned ledger 110 replicates a financial institution's internal ledger. In some implementations, the shared permissioned ledger 110 includes an exact, raw-format duplicate of the financial institution's internal ledger, and additionally includes a normalized version of the financial institutions internal ledger that includes only the required datapoints that can be used by the system 100. Financial institutions (i.e., the real-world entities associated with the client accounts 104) will never alter their own internal ledgers. The resource manager 102 oversees the shared permissioned ledger 110 which serves as a replication of the financial institutions' internal ledger.

The shared permissioned ledger 110 holistically includes information about numerous client accounts 104 (i.e., financial institutions such as banks, hedge funds, clearinghouses, exchanges, and so forth). The shared permissioned ledger 110 may include a copy of the data stored in the internal ledgers of two different financial institutions that may serve as counterparties to a trade. The shared permissioned ledger 110 is partitioned to store data on independent hardware for each client (i.e., the client ledger instances 112). The client ledger instances may be virtually partitioned while stored on the same hardware devices in a single geographic location. The client leger instances 112 may be spread across numerous geographic server locations that are each connected to a cloud-based database system.

Each data entry stored on the shared permissioned ledger 110 is associated with a principal (i.e., a financial institution or a party to a trade). The data entries may additionally include metadata that indicates who has permission to access the data. The data entries stored on the shared permissioned ledger 110 are immutable such that they cannot be deleted or modified. When a data entry needs to be deleted or modified, a new data entry is generated that references the obsolete data entry and includes an indication that the obsolete data entry should be deleted, and/or that information the obsolete data entry should be superseded. The execution platform 106 performs analysis on the trade data stored in the shared permissioned ledger 110 based on the most-recent data entries presumed to include the most up-to-date and accurate information.

In some cases, a trade undergoes a state change, and only one data entry is stored on the shared permissioned ledger 110 that reflects the state change. For example, if a trade is in the process of being settled and assets have been transferred out of an account associated with a first client and into a settlement account associated with the first client, then the resource manager 102 may cause a data entry to be stored only on the client ledger instance 112 associated with the first client, and not on any other client ledger instance associated with a counterparty to the trade. The resource manager 102 is generally trained to generate a data entry for an event only for those parties who require information about the event. In the example illustrated above, the counterparty to the trade does not need or have access to information indicating that the assets have been transferred from the account to the settlement account associated with the first client. In most cases, when assets move out of Bank A, a data entry is stored only on the client ledger instance for Bank; and when assets are moved to Bank B, a data entry is stored only the client ledger instance for Bank B.

Figure 4:
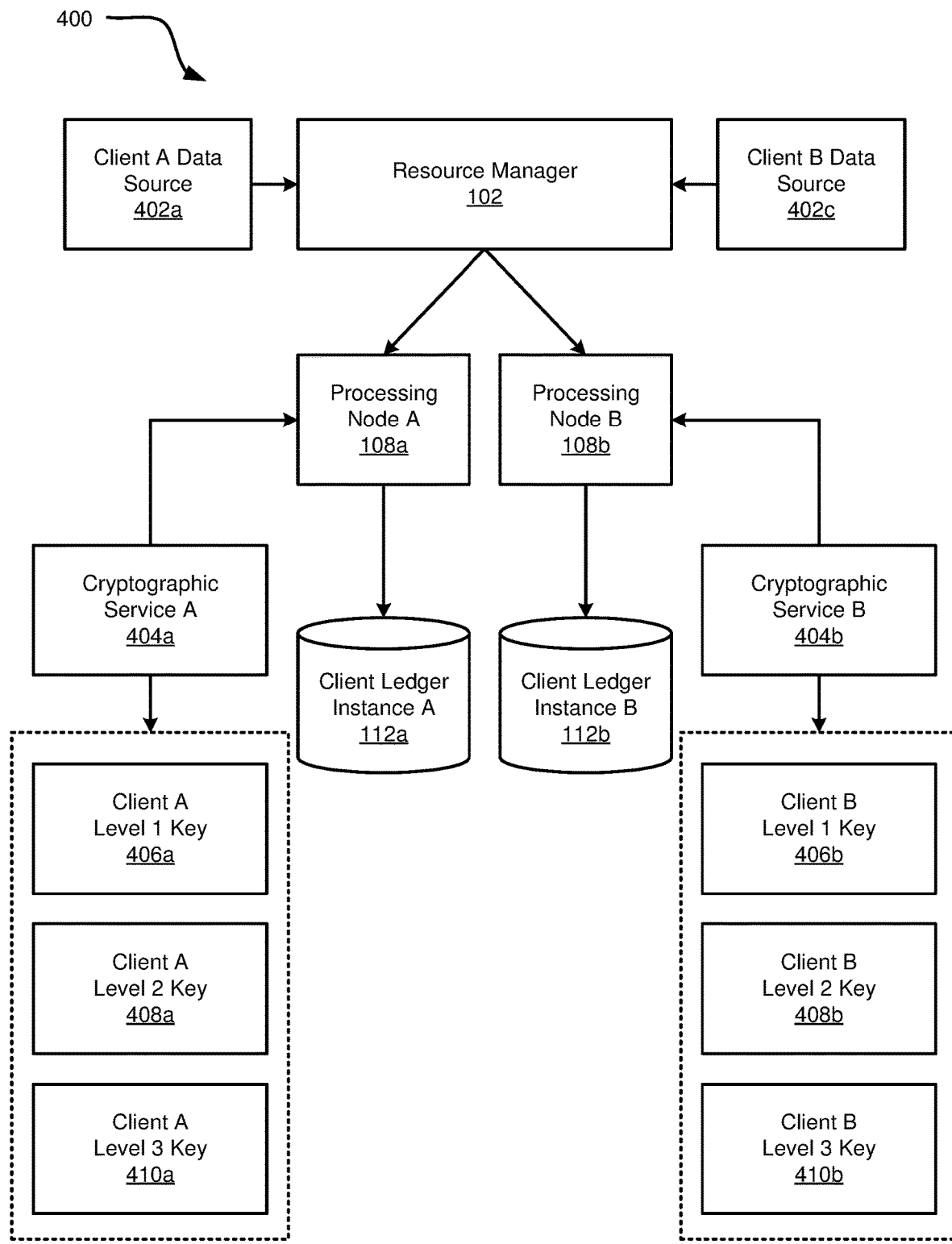
FIG. 4 is a schematic diagram of a system for data ingestion, user authentication, and granting access to data stored across a plurality of client ledger instances on a shared permissioned ledger.

FIG. 4 is a schematic diagram of a system 400 for data ingestion, user authentication, and granting access to data stored on the shared permissioned ledger 110. The system 400 includes the resource manager 102 receiving information from a plurality of data sources, including client A data source 402a, client B data source 402b, and so forth as needed. The resource manager 102 ingests the data from the client data sources 402 in a variety of data formats as provided by the client accounts. The resource manager 102 normalizes that data and causes the data to be stored on the shared permissioned ledger 110 in the applicable client ledger instances 112.

The resource manager 102 causes the data entries to be encrypted prior to storage on the client ledger instances 112. The resource manager 102 communicates with a cryptographic service 404 associated with each of the client accounts. The resource manager 102 communicates with cryptographic service A 404a for data associated with client account A, and the resource manager 102 communicates with cryptographic service B 404b for data associated with client account B. The cryptographic service 404 provides secured access to one or more keys associated with each client account.

In the example illustrated in FIG. 4, the cryptographic service A 404a enables access to three keys associated with client account A. The keys include client A level one key 406a, client A level two key 408a, and client A level three key 410a. Conversely, cryptographic service B 404b enables access to three keys associated with client account B. The keys include client B level one key 406b, client B level two key 408b, and client B level three key 410b. The different levels of keys may pertain to different types of data and/or different storage constructs within the client ledger instance 112.

The cryptographic service 404 may be run directly on the processing node 108. In some implementations, the cryptographic service 404 includes a software package provided by a third-party that is executed by the process node associated with the applicable client account. The resource manager 102 routes the node-specific traffic to the applicable processing node. The process node uses its own cryptographic key to encrypt the data. Thus, each processing node uses its own cryptographic service to encrypt the data. Therefore, only the processing node associated with a certain client account can read the data associated with that certain client account.

The cryptographic service 404 accesses each client's key stored in the client key storage and causes the data stored in the shared permissioned ledger to be encrypted or de-encrypted as needed. The cryptographic service 404 ensures security of the data entries stored in the shared permissioned ledger 110 using, for example, secure bifurcated keys that are stored in the client key storage. Each key is unique for the associated client node. When the resource manager 102 access the shared permissioned ledger 110, the resource manager 102 provides a data access request to the cryptographic service 404 that includes the appropriate key. This ensures that the data access request is authorized.

Cryptographic safeguards are used to detect data tampering in the resource manager 102 and any other systems or devices. Data written to the shared permissioned ledger 110 and any replicated data may be protected by one or more of the following, including: stapling all events associated with a single trade; providing logical connections of each commit to those that came before it was made; and immutable data entries. The logical connections in the shared permissioned ledger 110 are also immutable, but principals who are parties to a transaction can send messages for relinking. In this case, the current and preceding links are maintained. For example, trade amendments are quite common. A trade amendment needs to be connected to the original trade. For forensic analysis, a bank may wish to identify all trades by a particular trader. Query characteristics will be graphs, time series, and RDBMS (Relational Database Management System).

Figure 5A:
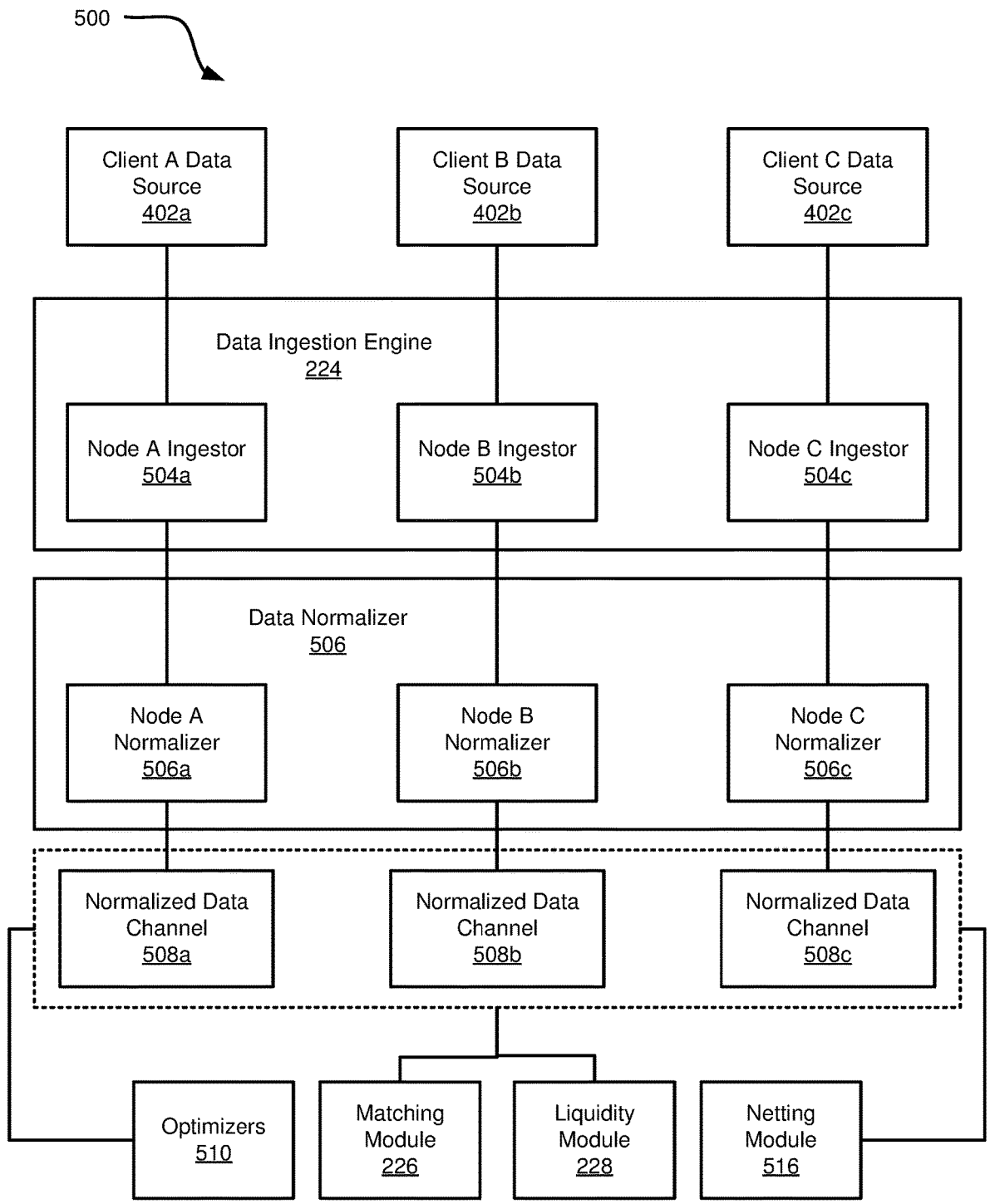
FIGS. 5A-5B illustrate schematic diagrams of a system for data ingestion comprising node-specific ingestors and node-specific normalizers for ingesting and processing data received from independent data stream event channels.
Figure 5B:
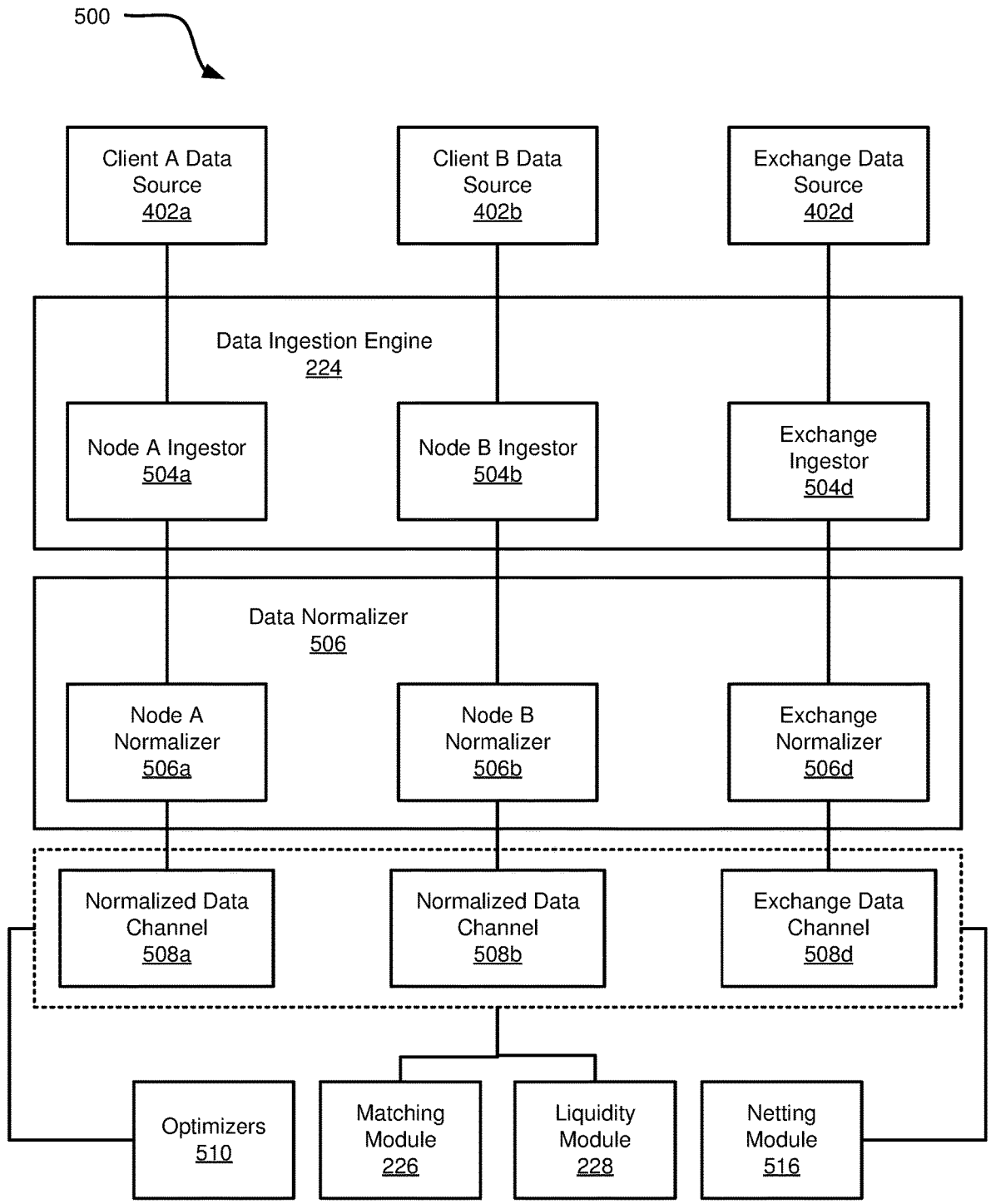

FIGS. 5A and 5B are schematic diagrams of a system 500 for data ingestion, wherein data is ingested directly from a client data stream without passing through a centralized resource manager as shown in FIGS. 1-4. The data ingestion elements illustrated in FIGS. 5A-5B may be implemented in any systems described herein, and specifically including the systems illustrated in FIGS. 1-4 that include a resource manager. Thus, data retrieved from a data source may pass directly through the data ingestion engine or may first pass through a resource manager without departing from the scope of the disclosure.

FIGS. 5A and 5B each illustrate example use-cases of the system 500 for data ingestion. FIG. 5A illustrates wherein a data ingestion engine 224 receives data directly from three separate data streams from three separate client accounts. FIG. 5B illustrates wherein the data ingestion engine 224 receives data directly from three separate data streams, wherein two of the data streams are associated with client accounts, and the third data stream is associated with a financial exchange or clearinghouse. It should be appreciated that the data ingestion engine 224 may receive data from any number of data streams connected with any number of financial institutions, banks, financial exchanges, clearinghouses, private equity funds, investment funds, capital markets, and so forth.

The system includes the data ingestion engine 224 of the resource manager 102. The data ingestion engine 224 includes an independent ingestor node for each client account. In the example illustrated in FIG. 5A, client account A feeds data to the data ingestion engine 224 by way of client A data source 402a, and this data is received by the node A ingestor 504a. Similarly, client account B feeds data to the data ingestion engine 224 by way of the client B data source 402b, and this data is received by the node B ingestor; client account B feeds data to the data ingestion engine 224 by way of the client C data source 402, and this data is received by the node C ingestor 504c. The data ingestion engine 224 receives data in a variety of formats and languages.

In the example illustrated in FIG. 5B, the data ingestion engine 224 receives data from the client A data source 402a and the client B data source 402b, and additionally receives data from an exchange data source 402d. The data ingestion engine 224 includes a dedicated exchange ingestor 504d that only receives data from an identified data stream provided by the exchange data source 402d. The input data stream may specifically include data pertaining to transactions between client A and client B. For example, client A may represent a first bank, and client B may represent a second bank that is trading with client A. In this example, the exchange data source 402d may have a dedicated data stream comprising information pertaining only to the transactions occurring between client A and client B and may explicitly exclude data pertaining to transactions occurring between any other entities operating under the exchange. The data from the exchange data source 402d is normalized by an exchange normalizer 506d and then fed into an exchange data channel 508d.

The system consumes data in real-time along with associated events and related metadata. The data ingestion engine 224 is a high throughput pipe that ingests data in multiple formats. The data is normalized to a canonical format, which is used by downstream engines. The system provides access to information in real-time to different parties of a trade, including calculations such as obligations and exposures of the participating parties.

The data ingestion engine 224 feeds the ingested data to the data normalizer 506 for the data to be normalized to a canonical format that can be stored on the shared permissioned ledger 110. The data normalizer 506 includes an independent normalizer node for each client account. In the example illustrated in FIG. 5A, the data from client account A is ingested and fed to the node A normalizer 506a; data from client account B is ingested and fed to node B normalizer 506b; and data from client account C is ingested and fed to the node C normalizer 506c. The data normalizer 506 partitions independent processing resources for each normalizer node. In an embodiment, the data normalizer 506 includes a plurality of processors, and the resource manager 102 scales the processing capability up and down based on current need across all client accounts. In an alternative embodiment, each client account has a set amount of processing resources allocated to data normalization, and the resource manager 102 does not scale the processing resources in real-time according to need.

The data ingestion engine 224 is a reliable high-throughput pipe with idempotency such that repeats of the same events do not alter the transaction data. The data ingestion engine 224 operates with idempotency by identifying unique identifiers associated with each event. The data ingestion engine 224 assigns a unique identifier to each event processed by the system 500. If the same event is processed again, the data ingestion engine 224 will generate the same unique identifier for that event. This ensures that the single event is not processed further by any other module (e.g., optimizers 410, matching module 226, liquidity module 228, netting module 516, and so forth), and the system 500 can operate with idempotency.

The data ingestion engine 224 supports the ability to ingest data in different formats from different participants. In some implementations, trade data entries include one or more of the following characteristics. All parties of the trade (principles, broker-dealers, exchanges, etc.) need to get access the information in near real time. A trade has a life cycle from the point of entry into the system, the execution, the augmentation of the data in the middle and back offices all the way through to the point where the trade is cleared/settled. Sometimes, the trades may be reversed before it is settled. During this lifecycle, trade metadata is being augmented. The parties of the trade as well as the banks that act as the custodians of the assets of the principals follow a protocol of confirmations and affirmations that are similar to an ACK set in a TCP protocol (with the noted difference that these are asynchronous systems). Trades are of different types and the metadata of the trade can change depending on the type of trade. Metadata can be thought of as columns to a row in a csv or fields of attributes in XML or JSON. The Financial Information exchange (FIX) protocol (and the xml version of it—Fixml) have become standards for the messages to capture the trade metadata between parties.

The data ingestion engine 224 may receive and categorize incoming data entries according to the following example protocol. A Node N(i) can trade with parties M(1) . . . M(N) for various products P(1) . . . P(N). A Trade notation T{(Mi, Ni), Pi} can be used to say that parties Mi and Ni have traded a product, Pi. In the case of a partial trade, it is possible that a trade submitted by Ni to Mi may be executed by Mi in separate batches that aggregate to the whole trade. A trade will result in several events to be recorded by each party of the trade. Each event is associated with a set of attributes. By association, these attributes are associated with the trade. Although these attributes are for the trade T{(Mi, Ni), Pi}, Mi and Ni may not have all the attributes as some attributes may be internal tracking attributes for either Mi or Ni. The data ingestion engine 224 ingests these events and the associated metadata for an event from both Mi and Ni.

The data normalizer 506 reads the data in the ingestor stream and converts the data into a standard format. The standard format may include a simplified version of the FIXML standard. The normalized data is pushed to a new stream (the normalized data channel 508) which will be consumed by downstream modules.

The normalized data is fed to the normalized data channel 508. The normalized data can then be used by downline modules and engines such as optimizer 510, the matching module 226, the liquidity module 228, and the netting module 516. The normalized data is stored on the shared permissioned ledger 110 according to database schema. The normalized data is partitioned and stored on a client ledger instance based on which client provided the data to the data ingestion engine 224.

The normalized data channel 508 is illustrated in FIG. 5A as a single logical unit. However, the normalized data channel 508 may be further broken down into specific channels for each client node. The purpose of normalized is to enable the system 100 to build models such as netting, matchers, optimizers, machine learning models, and the like on a normalized data format.

In an embodiment, each ingestor node 504 ingest data in a different format and in different locations. Some ingestor nodes may acquire data available in, for example, an FT folder. The files may be generated in real-time or by a batch process. Other ingestor nodes in the system 500 may acquire data available on a file storage system, such as a permissioned storage system or an HDFS (Hadoop Distributed File System). Some ingestor nodes in the system 500 may acquire data available in a queuing system such as an MQSeries implementation.

Prior to ingestion, the data resides within the boundaries of the client's systems and data centers (i.e., the client data source 402). The client must push the data to the data ingestion engine 224 for the data to be ingested by the systems described herein. The client pushes the data in near real-time to the data ingestion engine 224 so the data can be ingested, normalized, and assessed in real-time to determine the client's obligations, exposures, and real-time liquidity. The data ingestion engine 224 may include a "client push module" to establish a secure connection between the resource manager 102 and the client data source 402 using one or more client authentication modules to push the data from the client data source to the resource manager 102 in near real-time. The client may do this to handle vast amounts of data on the client side. In an embodiment, there is no attempt to normalize messages at the edge, and instead, the raw data is pushed to the data ingestion engine 224 in the received format. This can be important in implementations where normalization (by the client) could alter the data's original format in a manner that cannot be recovered once published to the data ingestion engine 224. Additionally, software errors in the client module could cause some data to be lost forever prior to ingestion by the data ingestion engine 224.

The system 500 may include a node-specific event channel for each node associated with a single client. In this alternative implementation (not illustrated in FIG. 5A), each of the "client data sources" is a node event channel associated with a client. One client may have a plurality of node event channels that may push different types of data, different volumes of data, and data in different formats. In this case, a separate ingestion event channel is opened for each of a client's nodes such that the system 500 dedicates a plurality of ingestion event channels to a single client. This can resolve numerous inefficiencies and inaccuracies that naturally arise when ingesting enormous sums of data in near real-time. This enables the data ingestion engine 224 to independently scale processing and storage resources for each of the plurality of ingestion event channels. The volume and rate of data may be different for each of a client's nodes, and therefore, a single node could overwhelm the system 500 and add latency to data ingestion for that client and other clients within the system 500. This issue is overcome by dedicating an independent ingestion event channel to each of the client's nodes, and then scaling processing and memory resources for the independent ingestion event channels as needed.

In an implementation where the system 500 includes a node-specific ingestion event channel for each of the client's nodes, the system 500 may additionally include a node-specific normalizer for each of the ingestion event channels. In this implementation, the system 500 includes an independent node normalizer 506 for normalizing data from each of a client's nodes. This can be particularly important where a single client has multiple nodes that each push data in a different format. If this is the case, the system 500 can still efficiently normalize the client's data by having a dedicated node normalizer for each of the client's data push nodes.

Additionally, strict service-level agreements (SLAs) may be in place that prohibit commingling to data. In some embodiments, this is treated as a "leased line" to the client. The resource manager 102 may implement a backup policy to archive data in the shared permissioned ledger 110 for longer periods of time than the client typically maintains the data in their own internal data systems. The resource manager 102 may cause a copy of the data to be stored on the shared permissioned ledger 110 in its raw format as received from the client, rather than the normalized format processed by the data normalizer 506.

The data received from the client data sources 402 is still in a raw format that is custom to the client's site. The node-specific event channels feed into the node-specific ingestors 504 and the node-specific normalizers 506 to normalize the data into a standard format that can be used by the resource manager 102. In an embodiment, the data is stored on the shared permissioned ledger 110 in the raw format as received from the client and is additionally stored in the normalized format that is organized according to database schema. The normalized data is fed into downline modules such as the optimizers 510, matching module 226, liquidity module 228, netting module 516, and so forth.

In an embodiment, the data normalizer 506 ingests data in the client's custom format and maps the data to a normalized format. This can be implemented similar to message-level ETL. The node-specific normalizer loads the data into the normalized data channel. The same design patterns that are used for building custom Swift adapters in a clearing gateway can be used in this component as well. The platform has support for building a normalized format based on a pluggable architecture which can be used to map the custom formats to the normalized format using templates. Based on the format of the customer specific data, a default template for the format can be used and then customized for any customer specific details. For example, SWIFT message processing can be based on the standard SWIFT message and further enhanced to support any customer specific fields. The platform is able to support multiple formats like FIXML, SWIFT, XML and comma separated files using pluggable architecture and templates.

The data ingestion engine 224 is a complex layer with numerous design considerations that compensate for the difficulty in predicting the various formats in which the system 500 will receive transaction messages. In some implementations, a bank (or other financial institution) will use the FIX format while others will send transaction data in internal, proprietary formats. The proprietary format may include a binary format, and each asset class may have its own format. The FIX specification can define different asset classes different. In some cases, a client will use the SWIFT messaging format for cash transfer requests and will use different formats for other transaction requests. Additionally, the data ingestion engine 224 consumes enormous sums of data from multiple clients in near real-time and must quickly normalize, categorize, and store the data so that it can be processed by downline systems.

The data ingestion engine 224 includes a parser for parsing messages and other data entries received from clients. The parser creates a set of name-value pairs for the data contained in a message. The parser causes the data to be nested, and the nesting is preserved when creating the name-value pairs. Once the nested name-value pairs are created, the data normalizer 506 attempts to normalize the message into a standard format. In some cases, the system 500 can simulate SWIFT messages and normalize those messages based on current standards.

In some cases, an exception will occur during the parsing process. Typically, the exception is a business exception but may also include an infrastructure exception. If an exception occurs during the parsing process, the exception will be captured. The exception is memorialized in an exception message that is sent to an exception queue. The client may be granted access to the exception queue by way of a dashboard. The exceptions are identified as messages in exception queues, some examples are having invalid data in the message fields like alphanumeric data in amount field. Another example is having an unmatched trade. The clients view the exception events/messages via a dashboard and can instruct to reprocess the data. Example an unmatched trade is resent for processing since the exception could be because of delay in receipt of other side of message.

In some implementations, as applicable, the data ingestion engine 224 and the data normalizer 506 do not truncate or make any data unavailable in the normalized format. The normalized format may not use all fields/attributes of the data. Any data that is not extracted is still made available.

In some cases, each of the channels (e.g., the raw event channels and the normalized data channels) have different archival policies. An archival policy determines the type of persistent (e.g., disk, storage area network, HDFS, etc.) archival, and the purging of older data. The archival policies may be different for each node, and by association, each channel. The system 500 supports the various archival policies through a configuration.

FIGS. 6A-6E illustrate a system 600 and process flow for data reconciliation and settlement across external account entities. The system 600 is a distributed account management system for executing trades between unrelated entities. The system 600 enables near real-time authentication of data entries by an electronic notary 602 that is central to the plurality of unrelated entities. The electronic notary 602 is in communication with the shared permissioned ledger 110 and can authenticate and sign hashed data entries stored on the shared permissioned ledger 110 and provided to the electronic notary 602 by the execution platform 106. The near real-time authentication of data entries by the electronic notary 602 enable asset movements to be executed between the unrelated entities without the use of a central bank.

The system 600 can be implemented to execute currency trades without the use of a central bank. In traditional systems, transactions are executed with a settlement bank, such as a central bank. The settlement banks offer a member-specific service such that not all account-types may be eligible for this type of settlement. Additionally, these transactions must be executed during certain times of the day, such as when the central bank is open and available. This causes very high peaks to occur during the day, which increases latency in human processing and computer processing for executing the transactions. Additionally, at certain times, the central bank may require very large sums of on-hand liquidity to be available from each settlement participant. The system 600 resolves each of these issues associated with traditional trading systems. The system 600 can be implemented to execute transactions between commercial banks without the use of a central bank.

The system 600 enables each party to the transaction to be associated with a different account bank (e.g., a commercial bank). In a single trade between two settlement participants, each settlement participant may be associated with two account banks for each currency. This enables the transaction to be executed with four total account banks. The settlement participants leverage a credit line that each account bank maintains other account banks as part of their corresponding banking relationships. This allows both settlement participants to execute the transaction using a commercial bank rather than a central bank. Additionally, the transaction can be executed at any time of day, including when central banks and the account banks are closed. The transaction is executed through the generation of secure ledger entries stored on the shared permissioned ledger and authenticated by the electronic notary 602 with the use of hashed data and a private key.

The system 600 includes a plurality of account entities, which may include commercial banks, hedge funds, lending institutions, and so forth. As discussed in connection with the example process flow illustrated in FIGS. 6A-6E, the account entities may be referred to as "account banks" with the shorthand identifier AB. FIGS. 6A-6E illustrate a system that includes four account banks, including AB1, AB2, AB3, and AB4. Each of the account banks includes a core banking application 610 and a protected ledger instance on the shared permissioned ledger 110. The account banks are in communication with an electronic notary 602.

In the example process flow illustrated in FIGS. 6A-6E, the left-hand side banks (AB1 and AB2) may be associated with a first currency, and the right-hand side banks (AB3 and AB4) may be associated with a second currency. In this example, each currency is associated with two separate account banks, and a transaction is executed using four total account banks. Each of the account banks may maintain a credit line for one or more of the other account banks as part of their corresponding trading relationships.

Each of the account banks, including AB1, AB2, AB3, and AB4 includes a core banking application 610 that may operate internally to the account bank itself and is not associated with the shared permissioned ledger 110. The core banking application 610 may include a ledger that stores data pertaining to account activity specific to the respective account bank.

Each of the account banks, including AB1, AB2, AB3, and AB4 is associated with a protected ledger instance stored on the shared permissioned ledger 110. The shared permissioned ledger 110 includes a ledger instance assigned to AB1. The ledger instance assigned to AB1 includes a subledger that stores data entries pertaining to a first settlement participant (SP1) to a transaction, and this subledger is depicted as Ledger Instance SP1. As discussed herein, the subledgers may alternatively be referred to as a "wallet" for storing an indication of the account contents for each settlement participant. The ledger instance assigned to AB2 further includes a subledger that stores data entries pertaining to a credit/debit relationship AB1 maintains for transactions with AB2, and this subledger is depicted as Ledger Instance AB2. The Ledger Instance AB2 includes data entries detailing transactions and settlements between AB1 and AB2 as part of their corresponding banking relationship.

The shared permissioned ledger 110 comprises a protected ledger instance assigned to AB2. This ledger instance includes a subledger that stores data entries pertaining to transactions and status updates for a second settlement participant (SP2) to the transaction, and this subledger is depicted as Ledger Instance SP2. This ledger instance additionally includes a subledger that stores data entries pertaining to a credit/debit relationship that AB2 maintains with AB1, and this subledger is depicted as Ledger Instance AB1. The Ledger Instance AB2 (stored on AB1's ledger instance) and Ledger Instance AB1 (stored on AB2's ledger instance) may store corresponding data entries that represent the corresponding perspectives to each transaction between AB1 and AB2.

Similarly, AB3 and AB4, which may be located in a different geographic region and may offer a different currency than AB1 and AB2, also each include their own core banking application 610 and protected ledger instance on the shared permissioned ledger 110. AB3 includes a ledger instance with a subledger that stores data entries pertaining to an account associated with the first settlement participant. AB4 includes a ledger instance with a subledger that stores data entries pertaining to an account associated with the second settlement participant. Further, AB3 includes a subledger that stores data entries pertaining to a debit/credit relationship that AB3 maintains with AB4. AB4 similarly includes a subledger that stores data entries pertaining to the debit/credit relationship that AB4 maintains with AB3.

The electronic notary 602 authenticates the data entries stored on the various ledger instances of the shared permissioned ledger 110 prior to settlement and execution of the transaction. The electronic notary 602 receives corresponding data entries from both sides of a transaction such that the electronic notary 602 can serve as an external, third-party authenticator for indicating that an event actually happened. The electronic notary 602 is executed by an independent processing node of the execution platform 106 and may be managed by the resource manager 102.

In an example implementation, AB1 sends funds to AB2. Specifically, AB1 sends funds from an SP1 account at AB1 (i.e., a first settlement participant to the transaction has an account with AB1) to an SP2 account at AB2 (i.e., the second settlement participant to the transaction has an account at AB2). AB1 records this transaction on the core banking application 610 that is internal to AB1. The data ingestion engine 224 includes an ingestor node that is dedicated to AB1 and may specifically be dedicated to the SP1 account at AB1. The ingestor node of the data ingestion engine 224 determines that the core banking application 610 at AB1 has a new data entry indicating that SP1 at AB1 transferred funds to SP2 at AB2. This data entry stored on the core banking application 610 for AB1 may be stored in a language that is proprietary to AB1 and must therefore be normalized by a dedicated normalizer node in the data normalizer 506 module. This data entry is fed to a normalized data channel and then stored on a ledger instance on the shared permissioned ledger 110 that is dedicated to AB1 (may be referred to as the AB1 ledger instance).

Continuing with the above example, AB2 receives the funds from AB1. Specifically, the SP2 account at AB2 receives the funds from the SP1 account at AB1. The data ingestion engine 224 further includes an ingestor node that is dedicated to AB2 and may specifically be dedicated to the SP2 account at AB2. The ingestor node determines that the core banking application 610 at AB2 has a new data entry indicating that SP2 at AB2 received funds from SP1 at AB1. The data entry stored on the core banking application 610 for AB2 may be stored in a language that is proprietary to AB2 and must therefore be normalized by a dedicated normalizer node in the data normalizer 506 module. This data entry is fed to a normalized data channel and then stored on a ledger instance on the shared permissioned ledger 110 that is dedicated to AB2 (may be referred to as the AB2 ledger instance).

Continuing with the above example, this transfer of funds from SP1 at AB1 to SP2 at AB2 triggers a notification to the electronic notary 602. The trigger to notify the electronic notary 602 may include in a workflow associated with the transfer of funds from AB1 to AB2. The execution platform 106 includes a processing node dedicated to AB1. The processing node dedicated to AB1 prepares a data package to be transferred to the electronic notary 602 node (the electronic notary 602 node may be an independent node on the execution platform 106). The data package prepared by AB1's processing node includes AB1's version of the transaction (i.e., that AB1 transferred funds to AB2) as it is stored on the AB1 ledger instance. Correspondingly, the execution platform 106 includes a processing node dedicated to AB2. The processing node dedicated to AB2 prepares a data package to be transferred to the electronic notary 602 node. The data package prepared by AB2's processing node includes AB2's version of the transaction (i.e., that AB2 received funds from AB1) as it is stored on the AB2 ledger instance. The corresponding data packages may each include metadata that stitches the data packages together and provides an indication to the electronic notary 602 that the data packages are referring to the same transaction. The metadata may include, for example, a transaction identifier that is generated by the resource manager 102 is unique to this transaction between AB1 and AB2. The metadata may further include client identifiers and account identifiers.

Continuing with the above example, the data packages prepared by the AB1 and AB2 processing nodes include hashed transaction data and local timestamps. The electronic notary 602 receives the hashed transaction data and the timestamp. The electronic notary 602 generates a new timestamp, rehashes the data, and signs the data with a private key. This data may be stored on the system data 116 datastore or may be stored on a database instance that is dedicated to the electronic notary 602. The operations of the electronic notary 602 are further described in FIGS. 7-11. The system 600 described herein enables the remote authentication of disparate data entries generated by unrelated entities. This enables the unrelated entities to transfer funds between each other without the use of a central bank or settlement bank.

The systems and methods described herein solve numerous computer-centric issues related to the ingestion, storage, assessment, and authentication of large sums of data. Each of the account banks illustrated in FIGS. 6A-6E, for example, may each generate enormous sums of data, and may sometimes generate millions of individual data entries each day. The data ingestion engine 224 and data normalizer 506 described herein each include a plurality of node-specific ingestors/normalizers that are each independently scalable from one another to meet client needs. Further, these enormous sums of data must be analyzed in real-time and stored securely on a distributed ledger such that corresponding data entries (e.g., credit/debit entries generated by unrelated entities and initially stored on unrelated core banking applications) can be identified, stitched together, and stored on corresponding ledger instances for future reference. Additionally, the systems and methods described herein introduce novel means of identifying corresponding data entries received from different entities, stitching together the corresponding data entries, and authenticating the validity of the data entries with an electronic notary 602. The systems and methods increase data security and reliability by separating the processing, storage, and authentication resources for different entities across a distributed network. The distributed network enables the entities to quickly transfer assets between each other without the use of a central bank or settlement bank by leveraging the improvements to computer technology described herein.

Figure 6A:
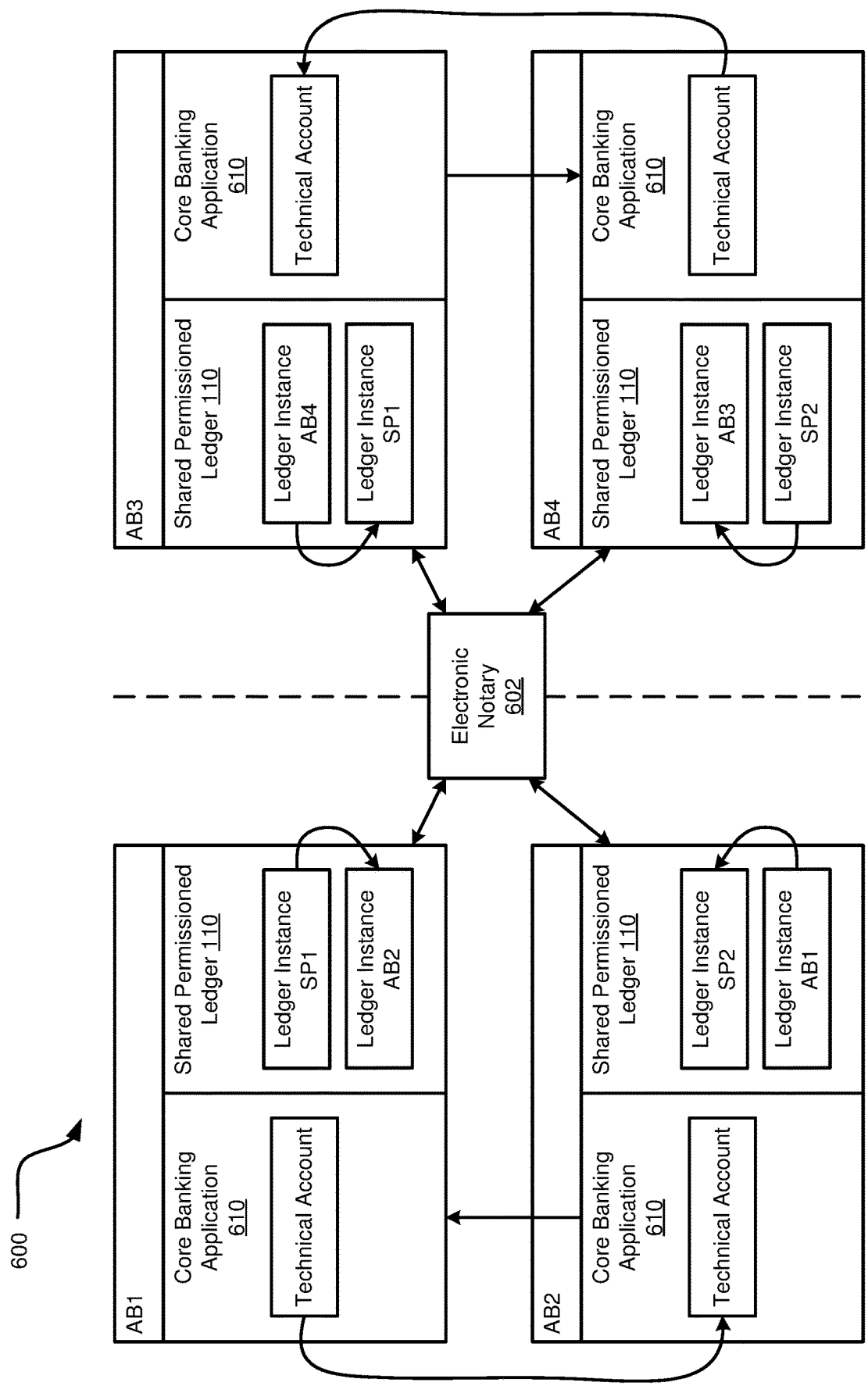
FIGS. 6A-6E illustrates a schematic diagram of a system and process flow for generating and authenticating data entries stored across independent ledger instances of a shared permissioned ledger.
Figure 6B:
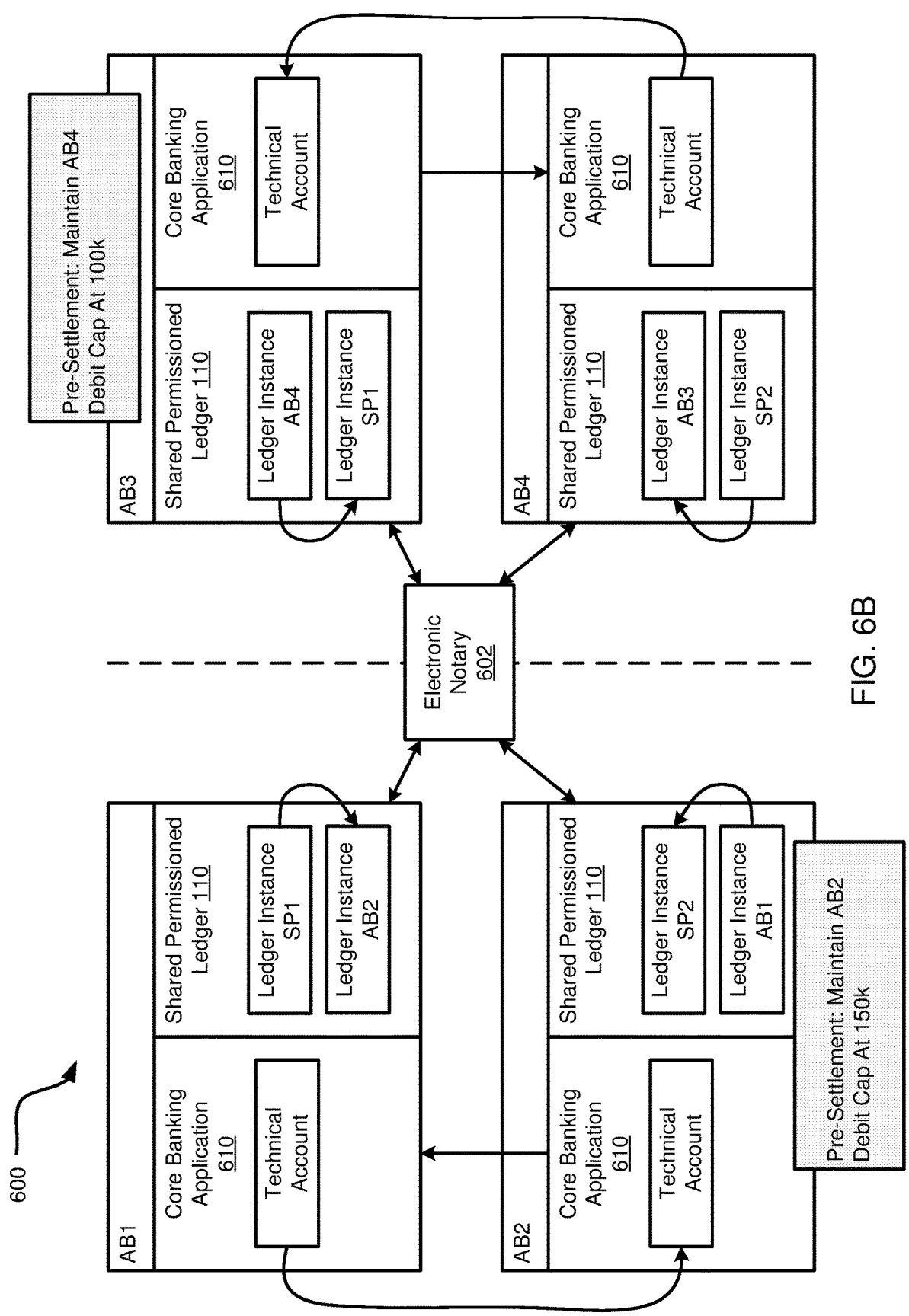

FIG. 6B illustrates a process flow for pre-settlement actions that occur prior to executing a settlement between the account banks AB1, AB2, AB3, and AB4. The process flow discussed in connection with FIGS. 6B-6E is exemplary only, with example currency quantities included for illustrative purposes only. In the example implementation, the pre-settlement process includes ensuring that AB2 maintains a debit cap of 150,000 USD with AB1. Further in the example, the pre-settlement process includes ensuring that AB3 maintains a debit cap of 100,000 EUR with AB4. The pre-settlement process is implemented to ensure there are funds available in the account associated with SP1 at AB1, and further to ensure there are funds available in the account associated with SP2 at AB4. The pre-settlement process is further implemented to ensure there is sufficient credit available for AB1 at AB2, and to ensure there is sufficient credit for AB4 at AB3. The reserve funds for the SP1 account at AB1, the SP2 account at AB4, the AB1 account at AB2, and the AB4 account at AB3 are all held in reserved on the shared permissioned ledger 110.

Figure 6C:
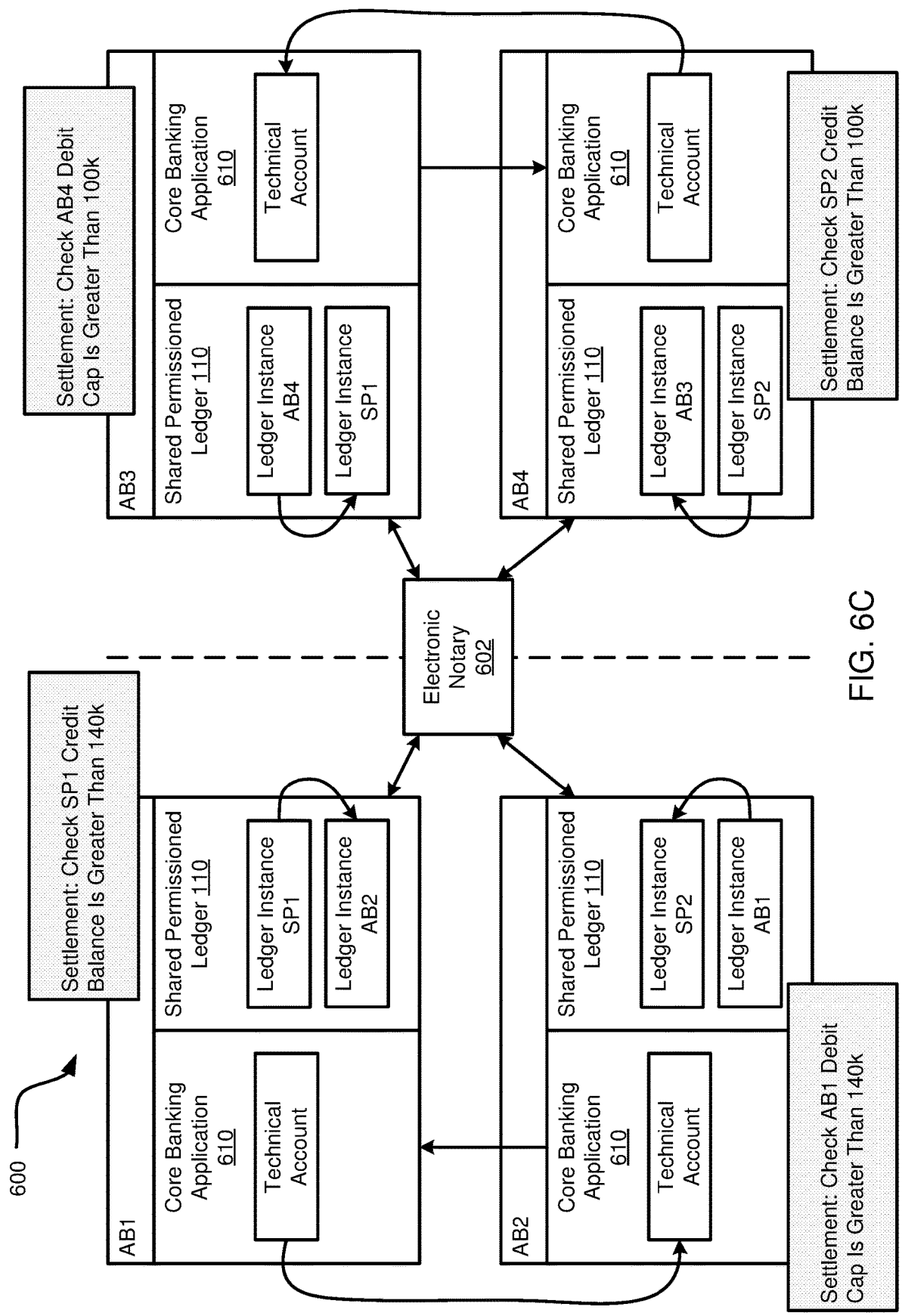

FIG. 6C illustrates a process flow for settlement of a currency exchange between commercial banks without using central banks. After the reserve pre-settlement steps are implemented, the data entries associated with the transaction are notarized by the electronic notary 602. As part of change in ownership, the following book-transfers occur on the shared permissioned ledger 110. The execution platform 106 generates new immutable data entries and stores these data entries in the appropriate ledger instances of the shared permissioned ledger 110 to represent the changes in ownership. The data entries stored on the shared permissioned ledger 110 indicates the following. In AB1, transfer amount reserved for settlement from the SP1 account to the AB2 account. In AB2, transfer the amount reserved for settlement from the AB1 account to the SP1 account. In AB3, transfer the amount reserved for settlement from the AB4 account to the SP1 account. In AB4, transfer the amount reserved for settlement from the SP2 account to the AB3 account.

In the example, the settlement process includes ensuring that SP1 has a credit balance at AB1 that is greater than 140,000 USD. The settlement process includes ensuring that AB1 maintains a debit cap at AB2 that is greater than 140,000 USD. The settlement process includes ensuring that AB3 maintains a debit cap that is greater than 100,000 EUR at AB3. The settlement process includes ensuring that SP2 maintains a credit balance at AB4 that is greater than 100,000 EUR.

Figure 6D:
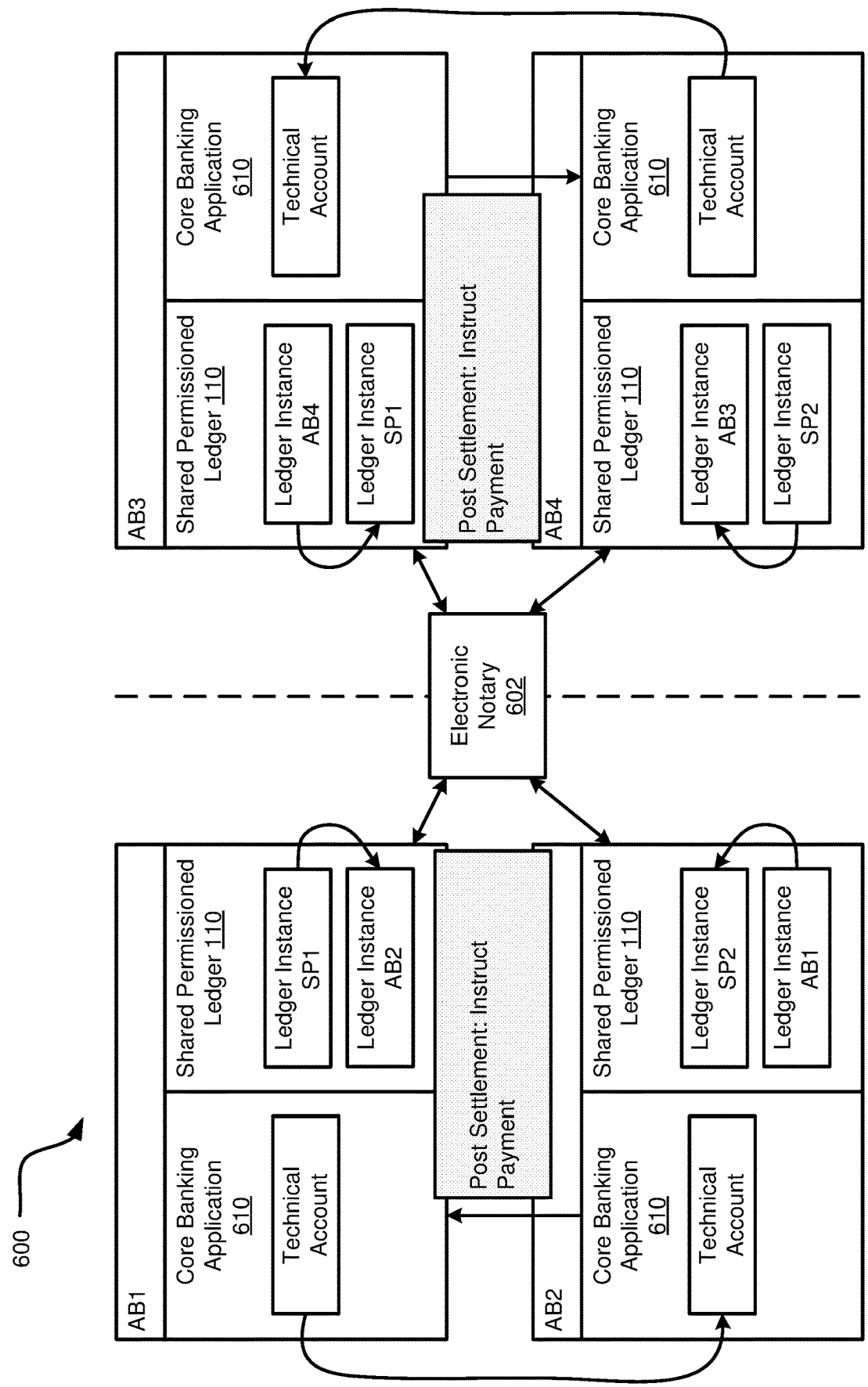

FIG. 6D illustrates a process flow of a portion of the post-settlement of a currency exchange between commercial banks without using central banks. In the example, the post-settlement process includes instructing payment from AB2 to AB1, and further instructing payment from AB3 to AB4.

Figure 6E:
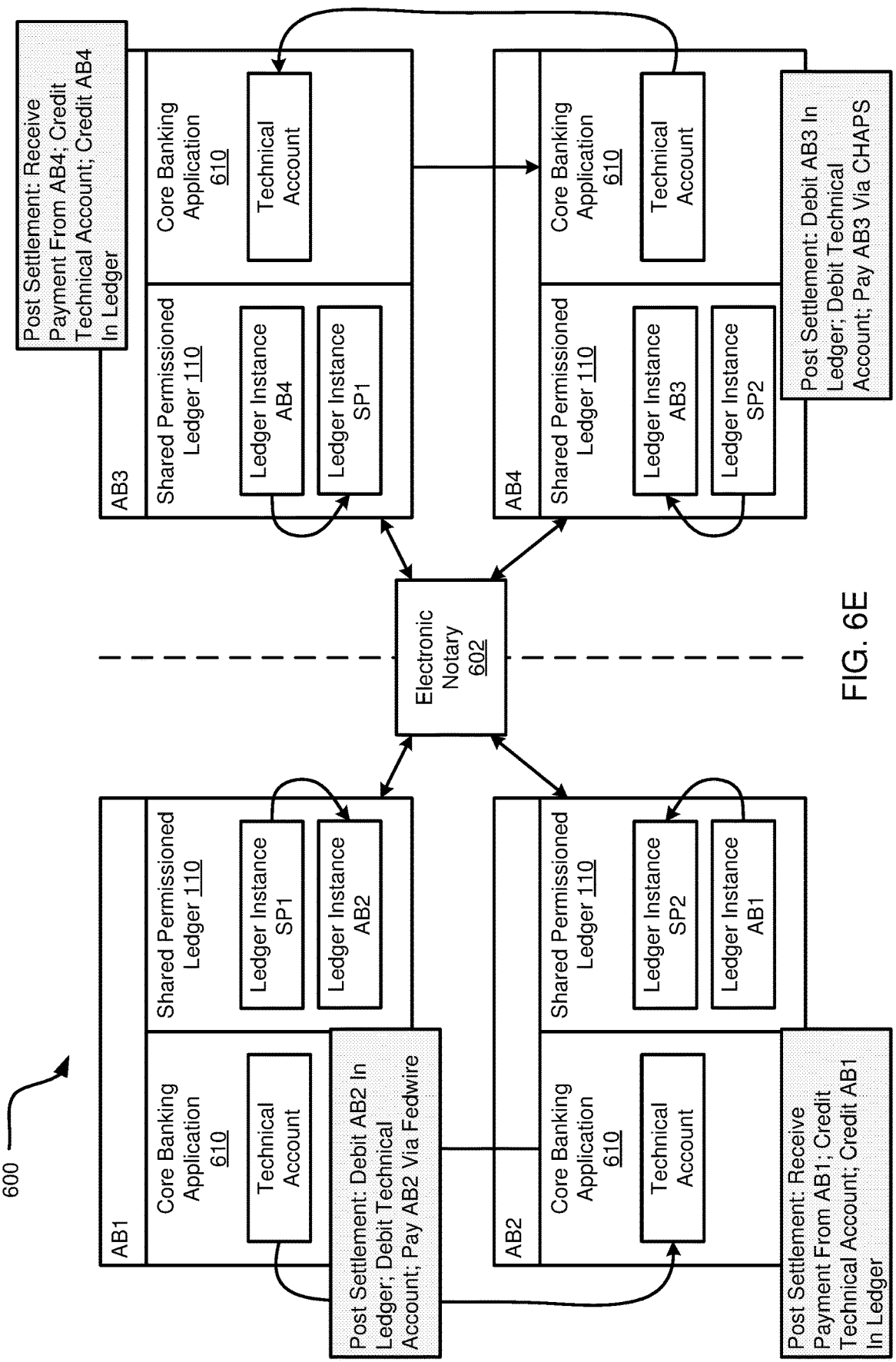

FIG. 6E illustrates a process flow of a portion of the post-settlement of a currency exchange between commercial banks without using central banks. In the example, and with respect to AB1, the post-settlement process includes debiting AB2 by creating an immutable storage device to be stored on the shared permissioned ledger 110 associated with AB1. The process further includes indicating that a data entry should be generated on the technical account on the core banking application 610 for AB1. The process further includes transferring funds from AB1 to AB2 by transferring funds from the technical account at AB1 to the technical account at AB2.

With respect to AB2, the process further includes receiving payment from AB1 into the technical account associated with AB2. The process includes crediting the technical account at AB2 based on the payment received from AB1. The process includes crediting AB1 on the shared permissioned ledger 110.

With respect to AB4, the process further includes debiting AB3 on the shared permissioned ledger. The process further includes debiting the technical account at AB4 and initiating payment to AB3. Further with respect to AB3, the process includes receiving payment from AB4 and crediting the technical account at AB3 based on the received payment. The process includes crediting AB4 on shared permissioned ledger 110 instance dedicated to AB3.

Any of the accounts at any of the account banks AB1, AB2, AB3, and AB4 can be funded any time before the start of settlement. Defunding may occur by withdrawing unreserved funds from settlement accounts at any bank. Additionally, interbank transfers may occur by initiating a transfer of funds between account banks as part of their corresponding banking relationships. These transfers unable the reset of the credit line for settlement.

Figure 6F:
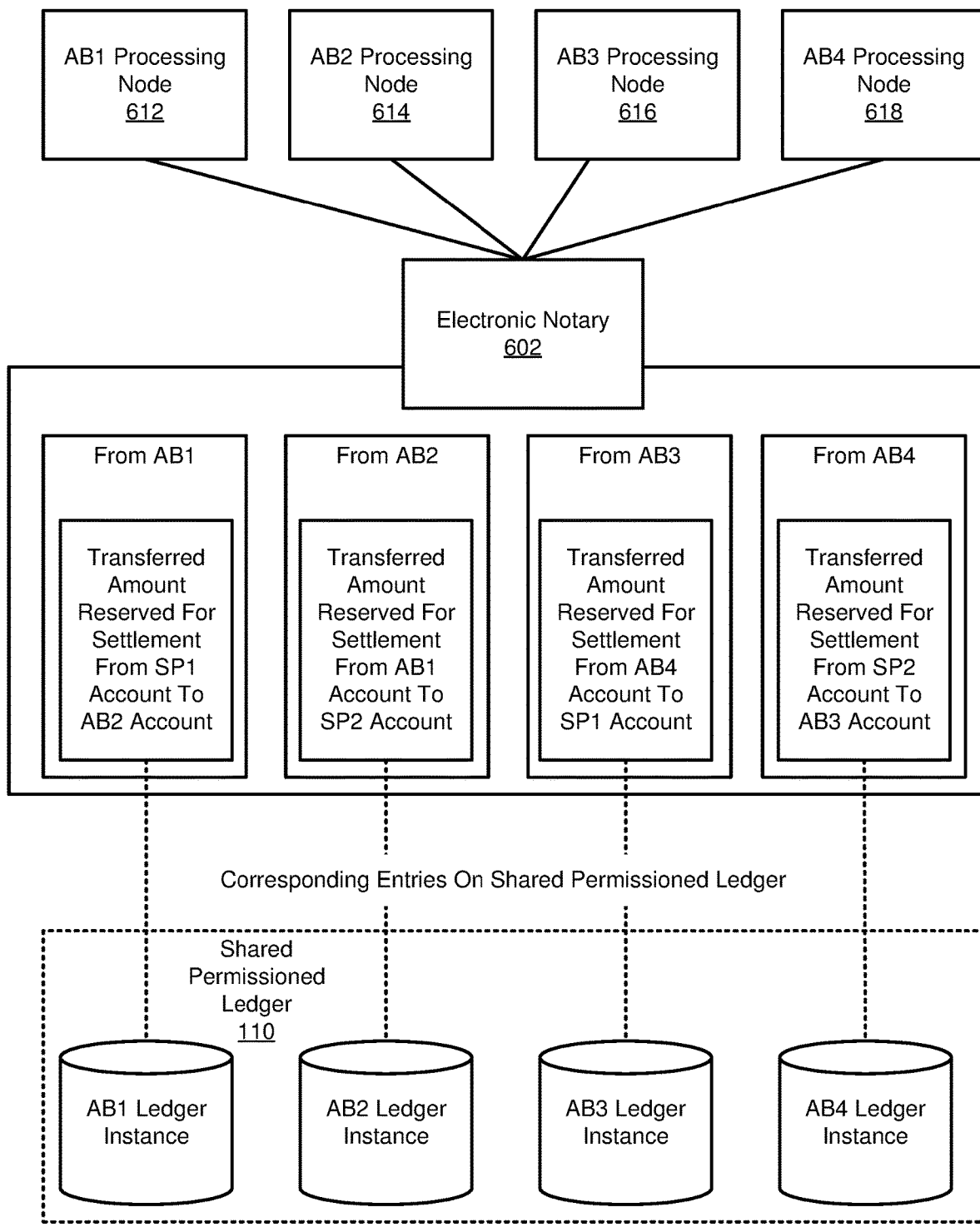
FIG. 6F is a schematic diagram of a system and process flow for providing data entries to the electronic notary for authentication with corresponding data entries being stored on the appropriate ledger instances of the shared permissioned ledger.

FIG. 6F is a schematic diagram of a system and process flow for providing data entries to the electronic notary 602. The execution platform 106 includes at least one processing node dedicated to each of the account banks. The AB1 processing node 612 is dedicated to performing operations associated with AB1; the AB2 processing node 614 is dedicated to performing operations associated with AB2; the AB3 processing node 616 is dedicated to performing operations associated with AB3; and the AB4 processing node 618 is dedicated to performing operations associated with AB4. In some implementations, the processing resources across the execution platform 106 are independently scalable to meet the real-time processing needs of each of the account banks. This real-time scalability may be managed and allocated by the resource manager 102.

Each of the dedicated processing nodes independently and individually communicates with the electronic notary 602. The electronic notary 602 is executed by a node on the execution platform 106, and the electronic notary's 602 node is independent and disparate from each of the nodes dedicated to the account banks. The electronic notary 602 serves as an independent third party that is unrelated to each of the account banks and is associated with independent processing and storage resources than any of the account banks (or other clients communicating with the resource manager 102). This increases the security and reliability of the electronic notary 602 and ensures the electronic notary 602 cannot be tampered with by one of the account banks. Further to the example illustrated in FIGS. 6A-6E, the electronic notary 602 is notified after every transfer of funds. In this example, the electronic notary 602 receives a data package from the AB1 processing node 612 after AB1 transfers the amount reserved for settlement from the SP1 account at AB1 to the AB2 account at AB1. The electronic notary 602 receives a data package from the AB2 processing node 614 when AB2 transfers the amount reserved for settlement from the AB1 account at AB2 to the SP2 account at AB2. The electronic notary 602 receives a data package from the AB3 processing node 616 when AB3 transfers the amount reserved for settlement from the AB4 account at AB3 to the SP1 account at AB3. The electronic notary 602 receives a data package from the AB4 processing node 618 when AB4 transfers the amount reserved for settlement from the SP2 account at AB4 to the AB3 account at AB4.

Each of the data packages provided to the electronic notary 602 includes data that is also stored on the shared permissioned leger 110. For example, the AB1 ledger instance additionally includes one or more data entries indicating that AB2 transferred the amount reserved for settlement from the SP1 account at AB1 to the AB2 account at AB1, and so forth. The storage resources for the shared permissioned ledger 110 are independent of the storage resources associated with the electronic notary 602. The electronic notary 602 may store and retrieve data from an independent database. The electronic notary 602 does not have read or write permissions for any of the ledger instances stored on the shared permissioned ledger 110. This increases data security and enables each of the account banks AB1, AB2, AB3, and AB4 to communicate with each other by way of the electronic notary 602 without granting access to data stored on that account bank's independent ledger instance on the shared permissioned ledger 110, or that account bank's internal core banking application 610. The electronic notary 602 authenticates the data packages received from each of the account banks and this enables the account banks to notify one another of transfers of assets by way of the electronic notary 602, which serves as an intermediary to the multiparty transaction.

Figure 7:
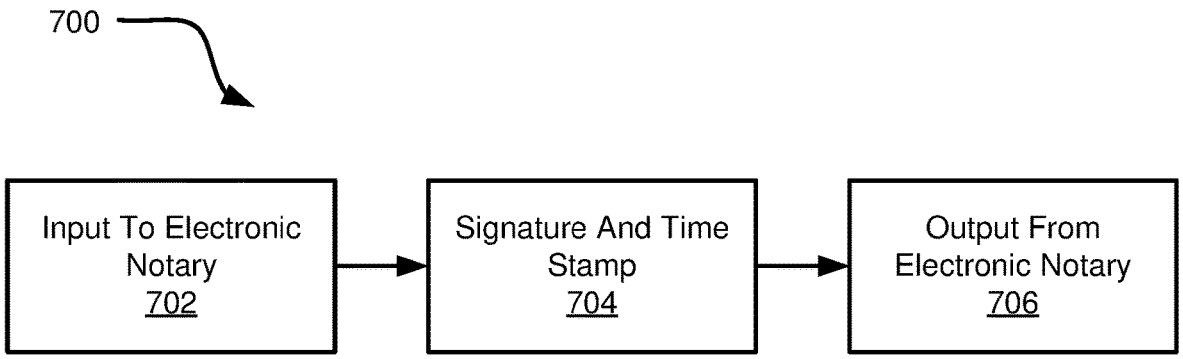
FIG. 7 is a schematic flow chart diagram of a process for authenticating data with a signature and timestamp.

FIG. 7 is a schematic diagram of a process 700 for performing an electronic notary service, such as performed by the electronic notary 602. The electronic notary 602 receives an input at 702 and the input to the electronic notary 702 is fed into a signature and timestamp module 704. The signature and timestamp module 704 outputs the output from electronic notary 706 data. The signature and timestamp module 705 may be designed to incorporate an ability to timestamp a large quantity of transactions each day.

Figure 8:
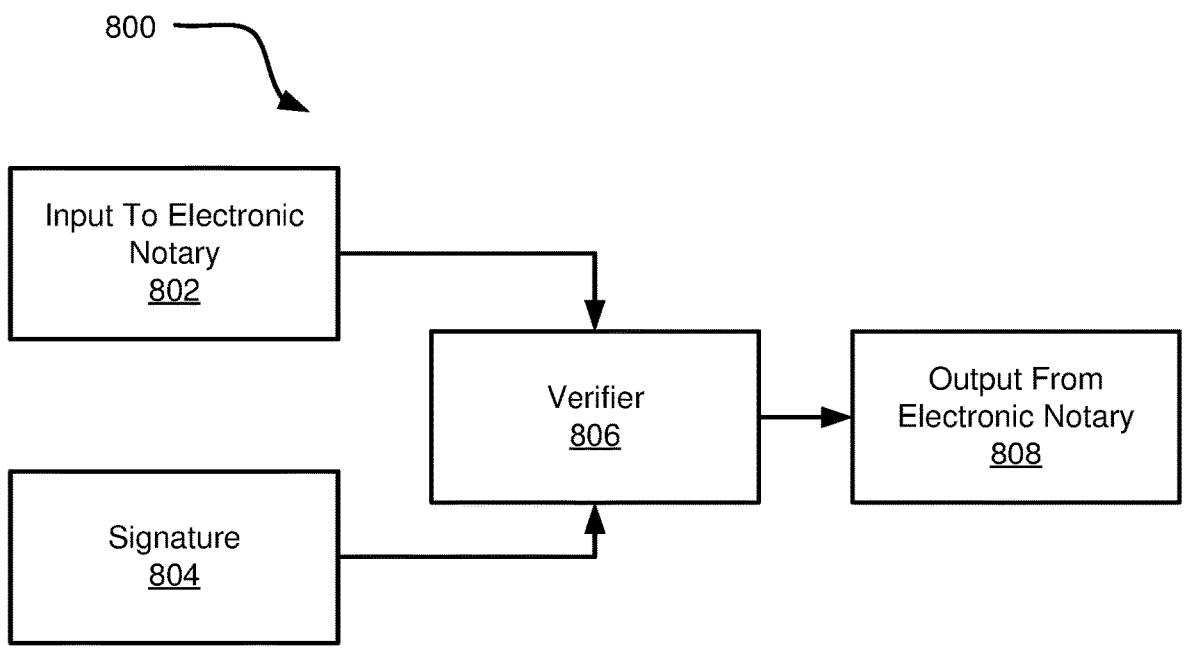
FIG. 8 is a schematic flow chart diagram of a process for authenticating data with a verifier of an electronic notary.

FIG. 8 is a schematic diagram of a process 800 for verifying signatures or timestamps associated with an electronic notary 602. A verifier module 806 receives the input to electronic notary (ITN) data 802 and further receives one or more signatures 804. The signatures 804 may be created by the signature and timestamp module 704 shown in FIG. 7. The verifier module 806 outputs the output from electronic notary (OFN) data 808. The verifier module 806 verifies the completeness and accuracy of timestamps. In particular implementations, this verification is done cryptographically.

The signature and timestamp module 704 is responsible for high-performance signing of documents. The signature and timestamp module 704 does not verify signatures provided to it. The signature and timestamp module 704 of the electronic notary 602 verifies transactions that are ready for settlement and is specifically configured to verify transactions between multiple commercial banks, such as the account banks illustrated in FIGS. 6A-6E. To aid in the efficient use of resources, the resource manager 102 ensures that the signature timestamp module 704 does not sign trades that are not ready for settlement.

The ITN (input to electronic notary) 702 may include a collection of data output by the account banks as part of the multiparty settlement process. The ITN 702 data includes one or more of a transaction identifier, client identifiers, trade-specific information, CCP identifiers, and indication of whether the transaction is gross or net, a settlement cycle identifier, a local timestamp, and a geographical region. The transaction identifier is generated by the resource manager 102 and/or the execution platform 106. The transaction identifier is used to stitch a plurality of immutable storage entries stored on the shared permissioned ledger 110 that each pertain to the same transaction. The transaction identifier is unique to a certain transaction. The client identifiers include identifying information for the client, which may include account numbers, routing numbers, and trade identifiers.

The trade-specific information includes the trade identifier, an indication of the type of asset to be transferred, an indication of the quantity of that asset that will be transferred as part of the trade, identities and/or account numbers of the participants to the trade, and so forth. The shared permissioned ledger 110 stores an indication of whether the transaction is gross or net, and this field captures the two types of settlement the transaction originated from. The electronic notary 602 applies its own timestamp, and the electronic notary 602 must determine whether the request is fraudulent; before the electronic notary 602 signs, the electronic notary 602 will account for minor clock drift and ensure that the local time is within the bounds of what would constitute a valid transaction. The geographical region indicates whether the settlement is in North America, Europe, or another region. This field can potentially help the resource manager 102 detect fraud in the network.

Figure 9:
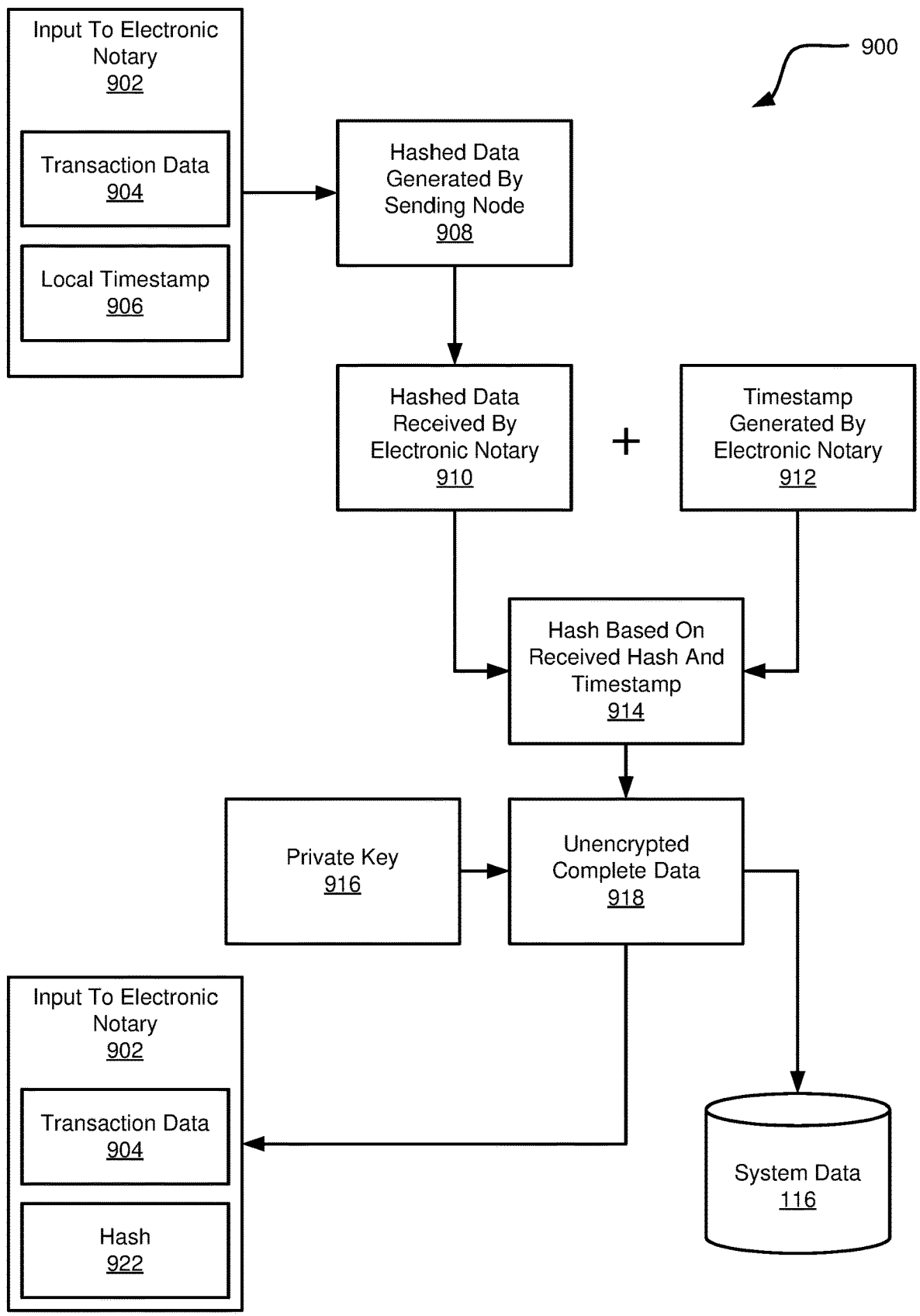
FIG. 9 is a schematic diagram of a process for authenticating hashed data with an electronic notary.

FIG. 9 is a schematic diagram of a process 900 for processing data that includes use of a hash function. During execution of the process 900, a sending node generates an ITN (input to electronic notary) 902 that includes transaction data 904 and a local timestamp 906. The local timestamp 906 represents the local time (or time and date) at the sending node. The ITN 902 may further include information related to all parties to a transaction as well as hashes for the parties. The hashed data generated by the sending node 90 is fed to the electronic notary 602. The electronic notary 602 receives hashed data 910, and this hashed data received by the electronic notary 910 is combined with a timestamp generated by the electronic notary 912. These datapoints are used to generate a hash based on the hashed data received by the electronic notary 910 and the timestamp generated by the electronic notary 912. This hash is used to generate the unencrypted complete data 918. The private key 916 is generated by the electronic notary 602. An encrypting module uses the private key 916 and the unencrypted complete data 918 to generate encrypted data, and this encrypted data is sent by the electronic notary 602 to the sending node. The response may be stored in an encrypted and/or unencrypted format on the system data 116 datastore.

A hash may be generated based on a hash function. For example, the data being hashed may be the data from a sending node, such as transactional data. In some embodiments, the transactional data includes a transaction identifier, principals of the transaction, a transaction amount, an asset associated with the transaction, and a hash generated by the sending node. The systems and methods described herein may consider the hash function, the value of the hash, and a timestamp when the hash was generated (e.g., the local time of the server generating the hash).

Figure 10:
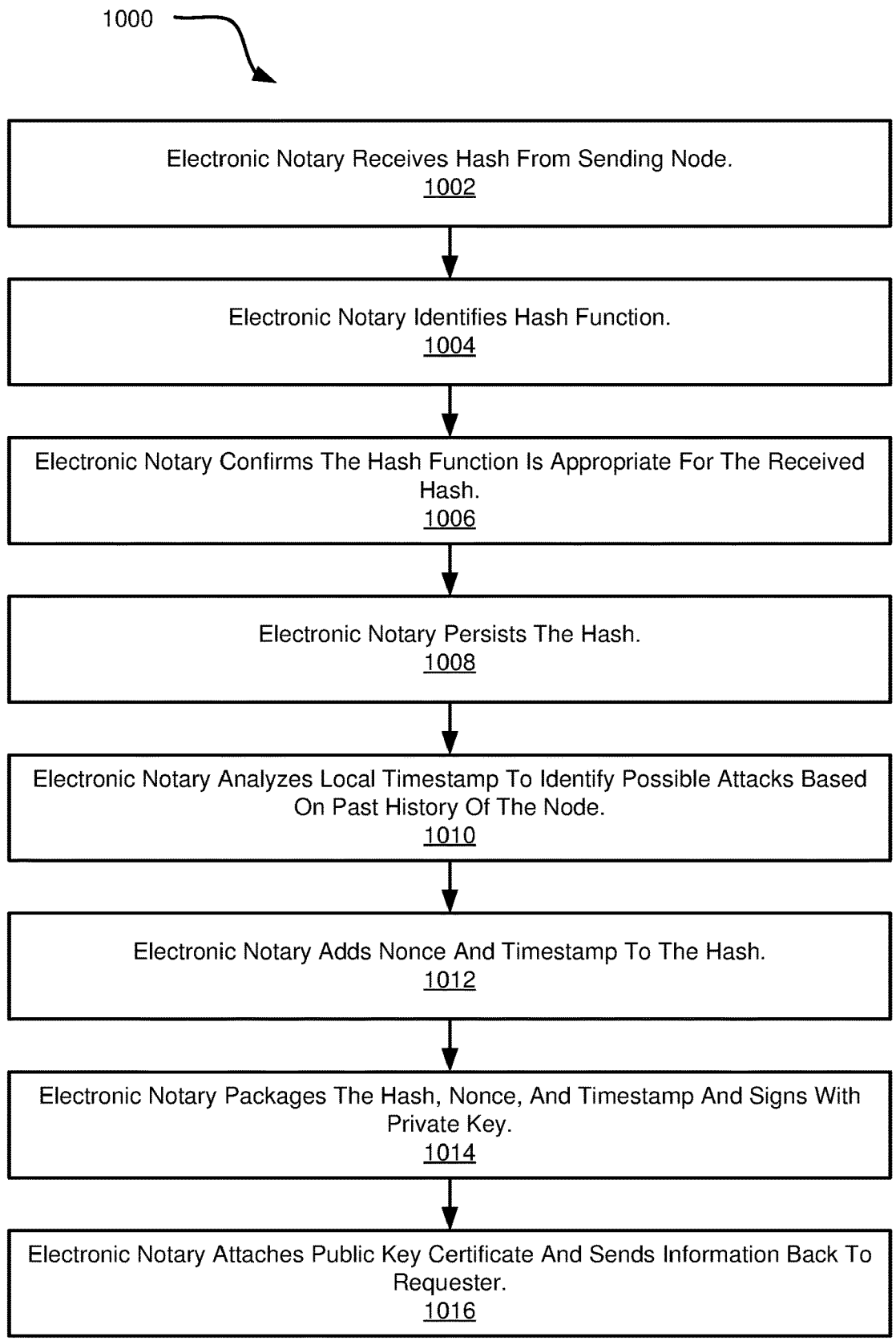
FIG. 10 is a schematic flow chart diagram of a method for authenticating hashed data with an electronic notary.

FIG. 10 is a schematic flow chart diagram of a method 1000 for performing an electronic notary service. The method 1000 begins and the electronic notary 602 receives at 1002 a hash from a sending node. The hash may be received as part of the data associated with the ITN. The electronic notary 602 identifies at 1004 or accesses a hash function. The method 1000 continues and the electronic notary 602 confirms at 1006 the hash function is appropriate for the received hash. In some embodiments, the method 1000 determines that the hash function is appropriate for the received hash based on data and possibilities of collision of multiple trades. For example, if two trades can be exact copies of each other, and can occur at similar times, hashes generated for these two trades need to be different with a low probability of collision against other trades. For similar trades, this may be handled by adding a nonce to the local timestamp. The electronic notary 602 then persists (or stores) at 1008 the hash for future reference.

The method 1000 continues as the electronic notary 602 analyzes at 1010 a local timestamp to identify possible attacks (such as man-in-the-middle attacks) based on data associated with a past history of the node (e.g., the sending node). The electronic notary 602 then adds at 1012 a nonce and a timestamp to the hash. For example, the nonce may be an arbitrary number that is only used once by the electronic notary service. Next, the electronic notary 602 packages at 1014 the hash, nonce, and timestamp, and signs them with the electronic notary's 602 private key. For example, the timestamp may have just been generated by the electronic notary 602. Finally, the electronic notary 602 attaches at 1016 a X.509 public key certificate and sends the information back to the requester (e.g., the sending node). The X.509 public key certificate can be generated on a per transaction basis or a per day basis.

In some embodiments, various error conditions are monitored and supported. If an error condition is detected, the electronic notary 602 requester may communicate information associated with the error condition to the requester, such as the sending node. Example error conditions include: badAlg wherein the hash algorithm was unsupported or unrecognized; badRequest wherein there was an error in the transaction part of the payload; badDataFormat wherein the data was incorrectly formatted; badHash wherein the hash value was not complete or did not correspond to the algorithm (e.g., hash function) used; replayDetected wherein the electronic notary 602 detects that it has signed this hash in the recent past; and systemFailure wherein there was an error in signing or generating the public key certificate or some other system error. In the case of the electronic notary 602 detecting that it has signed the hash in the recent past, the definition of recent may vary depending on the type of transaction and the typical time associated with settling that type of transaction. For example, in a T+3 settling world, "recent" may be approximately three days, in a T+2 settling world, "recent" may be approximately two days, and so forth.

The electronic notary 602 ensures that the transactions it signs (or authenticates) are not fraudulent. The electronic notary 602 guards against various types of attacks or other fraudulent activities. In some embodiments, the electronic notary service adds a nonce to the data sent back to the requester. This enables the requester to perform certain types of error checking on the received data. In some embodiments, the electronic notary 602 may use techniques discussed in RFC3161—Internet X.509 Public Key Infrastructure Time-Stamp Protocol (TSP).

In many situations, it is desirable for the electronic notary 602 to ensure that it does not sign the same transaction again. The electronic notary 602 does this by maintaining a list of hashes that it has signed and rejecting transactions where the hash value is repeated. This approach is different from the description in RFC3161. In the described systems and methods, the electronic notary 602 may persist the hashes that it receives in a file and check whether the current request contains a hash that it has received in the recent past. In some embodiments, the time for which this file is maintained is relatively small and configurable to the specific use-case and settlement windows that are supported for the use case.

One of the functions performed by the electronic notary 602 is associated with a verifier module that verifies (or validates) signed transactions. The verification process verifies that the signed data was unchanged. This can be accomplished by accessing the original unchanged data and applying the hash function to create a hash. The process then decrypts the digital time that was sent to it and evaluates whether the hash it just generated matches the hash of the decrypted data. If the hashes match, the signed data is verified (e.g., validated). If the hashes do not match, the signed data is not verified.

Figure 11:
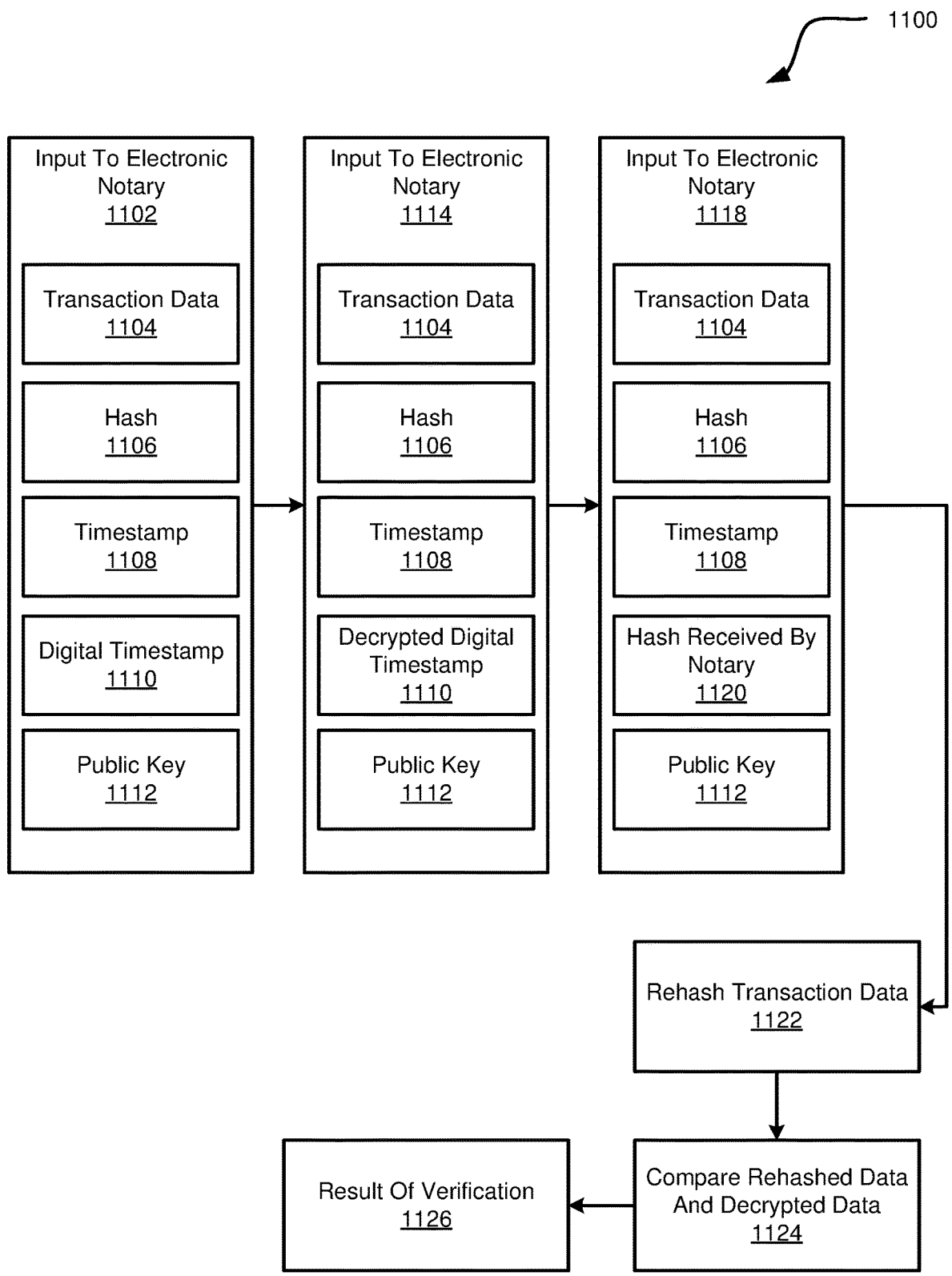
FIG. 11 is a schematic diagram of a process for authenticating hashed data input to an electronic notary with a timestamp and digital timestamp.

FIG. 11 is a schematic diagram of a process 1100 for validating signed transactions. The input to electronic notary (ITN) 1102 includes transaction data 1104, a hash 1106, a timestamp 1108, a PKCS 7 digital timestamp 1110, and a public key 1112. The PKCS 7 is a cryptographic message syntax standard. In this embodiment, the timestamp 1108 is a local timestamp (e.g., local to ITN 1102) and the PKCS 7 digital timestamp 1110 is an encrypted signed version of the timestamp where only a signing authority can verify that timestamp 1110 is correct given the timestamp in 1108. At the next step of the validation process 1100, the ITN 1114 includes the same information as ITN 1102, with the exception of a decrypted PKCS 7 digital timestamp 1116. As validation process 1100 continues, the ITN 1118 includes the same information as ITN 1102 and 1116, with the exception of a hash 1120 received by the electronic notary 602. As mentioned above, the validation process 1100 rehashes the transaction data at 1122. The rehashed transaction data is then compared 1124 to the decrypted data. If the rehashed transaction data matches the decrypted data, a result 1126 of validation process 1100 is the verification (or validation) of the signed transaction. If the rehashed transaction data does not match the decrypted data, the result 1126 of validation process 1100 is non-verification (or non-validation) of the signed transaction.

The systems and methods described herein use a tiered architecture that can scale up to requests for clearing and settlement. The architecture provides for an auto scaled architecture where micro services such as clearing services can scale up or shrink depending on the requests to the architecture.

Figure 12:
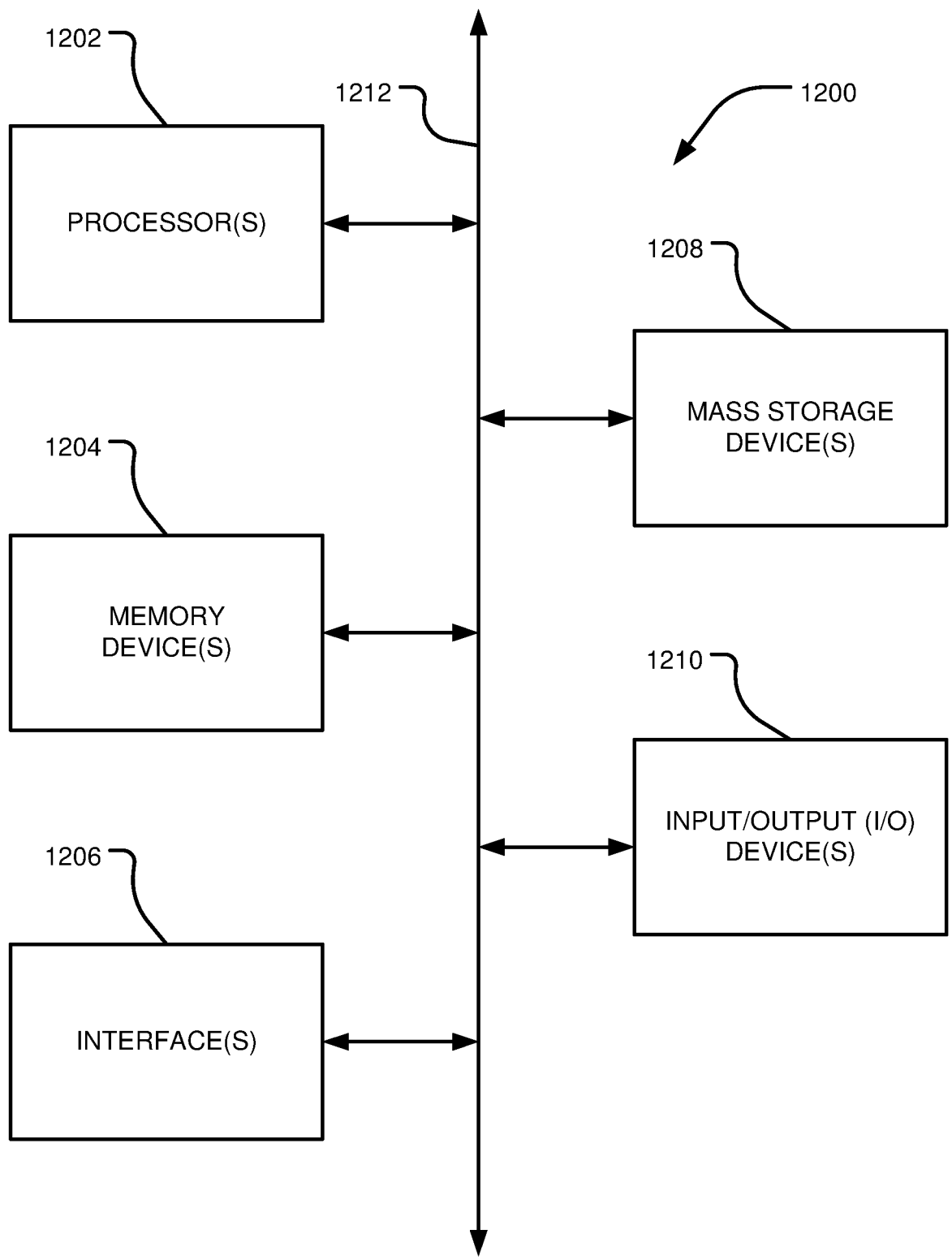
FIG. 12 is a schematic block diagram illustrating example components of a computing device.

FIG. 12 is a block diagram illustrating an example computing device 1200. The systems described herein are implemented with special purpose computers. The largescale data ingestion and data processing steps described herein cannot feasibly be executed with general purpose computers in the real world. Specifically, the systems described herein are implemented with highly specialized computers that are specifically configured to ingest, normalize, transcribe, store, and assess enormous quantities of data.

The special purpose computers described herein may function as a server, a client, a client node, a processing node, a ledger instance, a resource manager, or another computing entity described herein.

The computing device 1200 includes one or more processor(s) 1202, one or more memory device(s) 1204, one or more interface(s) 1206, one or more mass storage device(s) 1208, and one or more Input/Output (I/O) device(s) 1210, all of which are coupled to a bus 1212. The processor(s) 1202 include one or more processors or controllers that execute instructions stored in memory device(s) 1204 and/or mass storage device(s) 1208. The processor(s) 1202 may also include various types of computer-readable media, such as cache memory.

The memory device(s) 1204 include various computer-readable media, such as volatile memory (e.g., random access memory (RAM)) and/or nonvolatile memory (e.g., read-only memory (ROM)). Memory device(s) 1204 may also include rewritable ROM, such as Flash memory.

The mass storage device(s) 1208 include various computer readable media, such as magnetic tapes, magnetic disks, optical disks, solid state memory (e.g., Flash memory), and so forth. Various drives may also be included in mass storage device(s) 1208 to enable reading from and/or writing to the various computer readable media. The mass storage device(s) 1208 include removable media and/or non-removable media.

The I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, lenses, CCDs or other image capture devices, and the like.

The interface(s) 1206 include various interfaces that allow computing device 1200 to interact with other systems, devices, or computing environments. Example interface(s) 1206 include any number of different network interfaces, such as interfaces to local area networks (LANs), wide area networks (WANs), wireless networks, and the Internet.

The bus 1212 allows processor(s) 1202, memory device(s) 1204, interface(s) 1206, mass storage device(s) 1208, and I/O device(s) 1210 to communicate with one another, as well as other devices or components coupled to bus 1212. The bus 1212 represents one or more of several types of bus structures, such as a system bus, PCI bus, IEEE 3594 bus, USB bus, and so forth.

EXAMPLES

The following examples pertain to further embodiments.

Example 1 is a system. The system includes a shared permissioned ledger comprising a plurality of independent ledger instances, wherein the plurality of independent ledger instances comprises: a first ledger instance storing data received from a first data stream provided by a first client; a second ledger instance storing data received from a second data stream provided by a second client; and a third ledger instance storing data received from a third data stream provided by an exchange, wherein the third data stream comprises data entries pertaining to a transaction between the first client and the second client. The system includes a processor in communication with the shared permissioned ledger, wherein the processor matches a plurality of data entries stored on the shared permissioned ledger that each pertain to the transaction between the first client and the second client. The processor determines whether each of the plurality of data entries agree with each other to a threshold degree regarding the transaction between the first client and the second client.

Example 2 is a system as in Example 1, wherein the processor is a component of an execution platform comprising a plurality of independent processing nodes, wherein the plurality of independent processing nodes comprises: a first processing node dedicated to the first client; a second processing node dedicated to the second client; and a third processing node dedicated to the exchange.

Example 3 is a system as in any of Examples 1-2, wherein data stored on the shared permissioned ledger is permissioned such that: the first processing node does not have read or write permissions for the second ledger instance or the third ledger instance; the second processing node does not have read or write permissions for the first ledger instance or the third ledger instance; and the third processing node does not have read or write permissions for the first ledger instance or the second ledger instance.

Example 4 is a system as in any of Examples 1-3, wherein the first data stream comprises data pertaining to transactions occurring on a first core banking application associated with the first client, and wherein the second data stream comprises data pertaining to transactions occurring on a second core banking application associated with the second client.

Example 5 is a system as in any of Examples 1-4, wherein each of the first client and the second client is in communication with an electronic notary that validates data entries stored on each of the first ledger instance and the second ledger instance of the shared permissioned ledger.

Example 6 is a system as in any of Examples 1-5, wherein each of the first client and the second client is a financial institution, and wherein: the first ledger instance comprises a first subledger dedicated to a first settlement participant managed by the first client; and the second ledger instance comprises a second subledger dedicated to a second settlement participant managed by the second client.

Example 7 is a system as in any of Examples 1-6, wherein the first settlement participant and the second settlement participant are executing the transaction between the first client and the second client, and wherein the plurality of data entries pertaining to the transaction between the first client and the second client comprises: a data entry stored on the first subledger comprising information pertaining to the transaction from a perspective of the first settlement participant; a data entry stored on the second subledger comprising information pertaining to the transaction from a perspective of the second settlement participant; and a data entry stored on the third ledger instance comprising information pertaining to the transaction from a perspective of the exchange, wherein the exchange monitors transactions between the first client and the second client.

Example 8 is a system as in any of Examples 1-7, wherein the processor is configured to determine whether the plurality of data entries agree to the threshold degree based on one or more of a value for the transaction, a time for the transaction, or an identification of parties for the transaction.

Example 9 is a system as in any of Examples 1-8, wherein the processor is configured to alert one or more of the first client, the second client, or the exchange in response to determining that the plurality of data entries do not agree within the threshold degree.

Example 10 is a system as in any of Examples 1-9, wherein the threshold degree is a threshold percentage or value for which the plurality of data entries may disagree on a monetary value for the transaction between the first client and the second client.

Example 11 is a system as in any of Examples 1-10, wherein the processor is configured to generate instructions to settle the transaction between the first client and the second client in response to determining the plurality of data entries do agree with each other within the threshold degree.

Example 12 is a system as in any of Examples 1-11, wherein settling the transaction between the first client and the second client comprises updating the shared permissioned ledger to reflect a movement of assets between the first client and the second client.

Example 13 is a system as in any of Examples 1-12, wherein settling the transaction between the first client and the second client comprises settling without using a central bank.

Example 14 is a system as in any of Examples 1-13, further comprising an electronic notary that validates data entries stored on the shared permissioned ledger.

Example 15 is a system as in any of Examples 1-14, further comprising an execution platform in communication with the shared permissioned ledger, wherein the execution platform settles asset movement between the first client and the second client by generating corresponding data entries to be stored on the first ledger instance and the second ledger instance.

Example 16 is a system as in any of Examples 1-15, wherein the execution platform generates hashed transaction data representing the asset movement between the first client and the second client and provide the hashed transaction data to an electronic notary.

Example 17 is a system as in any of Examples 1-16, wherein the electronic notary receives the hashed transaction data from the execution platform, wherein the hashed transaction data comprises a transaction identifier associated with the asset movement between the first client and the second client.

Example 18 is a system as in any of Examples 1-17, wherein the execution platform provides a timestamp to the electronic notary, and wherein the timestamp is generated approximately at a time when the execution platform provides the hashed transaction data to the electronic notary.

Example 19 is a system as in any of Examples 1-18, wherein the electronic notary validates the hashed transaction data and the timestamp.

Example 20 is a system as in any of Examples 1-19, wherein the electronic notary signs the hashed transaction data with a private key and adds a second timestamp to the hashed transaction data.

Example 21 is a system as in any of Examples 1-20, wherein the electronic notary generates a new data package comprising the hashed transaction data and the second timestamp.

Example 22 is a system as in any of Examples 1-21, wherein the shared permissioned ledger enables settlement of assets between each of the first client and the second client without moving assets to a central bank.

Example 23 is a system as in any of Examples 1-22, wherein the shared permissioned ledger is not distributed across a blockchain network.

Example 24 is a system as in any of Examples 1-23, further comprising a data normalization engine, wherein the data normalization engine comprises: a first normalization node dedicated to translating data from the first data stream into a canonical format; a second normalization node dedicated to translating data from the second data stream into the canonical format; and a third normalization node dedicated to translating data from the third data stream into the canonical format.

Example 25 is a system as in any of Examples 1-24, wherein each of the first data stream, the second data stream, and the third data stream is ingested by the system in a different format, and wherein data from each of the first data stream, the second data stream, and the third data stream is translated to the same canonical format understood by the processor.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one implementation," "an implementation," "an example implementation," "selected implementations," "certain implementations," etc., indicate that the implementation or implementations described may include a particular feature, structure, or characteristic, but every implementation may not necessarily include the particular feature, structure, or characteristic. Additionally, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

While various implementations of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary implementations but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

What is claimed is:

1. A system comprising:
  a database comprising a plurality of independent database instances, wherein the database stores a version of a shared permissioned ledger across the plurality of independent database instances, and wherein the plurality of independent database instances comprises:
    a first database instance dedicated to a first client, wherein the first database instance stores data received from a first data stream provided by the first client;
    a second database instance dedicated to a second client, wherein the second database instance stores data received from a second data stream provided by the second client; and
    a third database instance dedicated to an exchange, wherein the third database instance stores data received from a third data stream provided by the exchange, and wherein the third data stream comprises data entries pertaining to a transaction between the first client and the second client; and
  a cloud computing processor comprising hardware that executes instructions comprising:
    matching a plurality of data entries stored on the shared permissioned ledger that each pertain to the transaction between the first client and the second client;
    identifying transaction data based upon the plurality of data entries pertaining to the transaction between the first client and the second client;
    hashing the transaction data with a requester hash to generate hashed transaction data;
    providing an authentication package to an electronic notary, wherein the authentication package comprises the hashed transaction data, a requester timestamp, and a public key;
    receiving from the electronic notary rehashed transaction data, a nonce, a notary timestamp, a private key signature, and a public key certificate; and
    authenticating the transaction data in response to determining the rehashed transaction data matches decrypted transaction data pertaining to the transaction between the first client and the second client;
    wherein the shared permissioned ledger is not distributed across a blockchain network.

2. The system of claim 1, further comprising an execution platform comprising a plurality of independent processing nodes, wherein the plurality of independent processing nodes comprises:
  a first processing node dedicated to the first client;
  a second processing node dedicated to the second client; and
  a third processing node dedicated to the exchange.

3. The system of claim 2, wherein the version of the shared permissioned ledger stored across the plurality of independent database instances is permissioned such that:
  the first processing node does not have read or write permissions for the second database instance or the third database instance;
  the second processing node does not have read or write permissions for the first database instance or the third database instance; and
  the third processing node does not have read or write permissions for the first database instance or the second database instance.

4. The system of claim 1, wherein the first data stream comprises data pertaining to transactions occurring on a first core banking application associated with the first client, and wherein the second data stream comprises data pertaining to transactions occurring on a second core banking application associated with the second client.

5. The system of claim 1, wherein each of the first client and the second client is in communication with the electronic notary, and wherein the electronic notary validates data entries stored on each of the first database instance and the second database instance of the shared permissioned ledger.

6. The system of claim 1, wherein each of the first client and the second client is a financial institution, and wherein:
  the first database instance comprises a first subledger dedicated to a first settlement participant managed by the first client; and
  the second database edger instance comprises a second subledger dedicated to a second settlement participant managed by the second client.

7. The system of claim 6, wherein the first settlement participant and the second settlement participant are executing the transaction between the first client and the second client, and wherein the plurality of data entries pertaining to the transaction between the first client and the second client comprises:

a data entry stored on the first subledger comprising information pertaining to the transaction from a perspective of the first settlement participant;

a data entry stored on the second subledger comprising information pertaining to the transaction from a perspective of the second settlement participant; and a data entry stored on the third ledger instance comprising information pertaining to the transaction from a perspective of the exchange, wherein the exchange monitors transactions between the first client and the second client.

8. The system of claim 7, wherein the instructions executed by the cloud computing processor further comprise determining whether each of the plurality of data entries agree with each other to a threshold degree regarding the transaction between the first client and the second client, and wherein the determining is based upon one or more of a value for the transaction, a time for the transaction, or an identification of parties for the transaction.

9. The system of claim 8, wherein the instructions executed by the cloud computing processor further comprise alerting one or more of the first client, the second client, or the exchange in response to determining that the plurality of data entries do not agree within the threshold degree.

10. The system of claim 9, wherein the threshold degree is a threshold percentage or value for which the plurality of data entries may disagree on a monetary value for the transaction between the first client and the second client.

11. The system of claim 1, wherein the instructions executed by the cloud computing processor further comprise generating instructions to settle the transaction between the first client and the second client in response to determining the plurality of data entries do agree with each other within the threshold degree.

12. The system of claim 11, wherein the instructions executed by the cloud computing processor are such that settling the transaction between the first client and the second client comprises updating the shared permissioned ledger to reflect a movement of assets between the first client and the second client, and wherein updating the shared permissioned ledger comprises updating two or more of the plurality of independent database instances.

13. The system of claim 12, wherein settling the transaction between the first client and the second client comprises settling without using a central bank.

14. The system of claim 1, further comprising the electronic notary, wherein the electronic notary has read access to the first database instance and the second database instance, and wherein the electronic notary validates data entries stored on the shared permissioned ledger.

15. The system of claim 1, further comprising an execution platform in communication with the shared permissioned ledger, wherein the execution platform settles asset movement between the first client and the second client by generating corresponding data entries to be stored on the first database instance and the second database instance.

16. The system of claim 1, wherein the instructions executed by the cloud computing processor further comprise generating the requester timestamp approximately at a time when the hashed transaction data is provided to the electronic notary.

17. The system of claim 16, wherein the electronic notary validates the hashed transaction data and the requester timestamp.

18. The system of claim 17, wherein the rehashed transaction data is hashed by electronic notary based upon the hashed transaction data, the nonce, and the notary timestamp.

19. The system of claim 1, wherein the shared permissioned ledger enables settlement of assets between each of the first client and the second client without moving assets to a central bank.

20. The system of claim 1, wherein the first database instance stores only data associated with the first client, and wherein the second database instance stores data only associated with the second client.

21. The system of claim 1, further comprising a data normalization engine, wherein the data normalization engine comprises:

a first normalization node dedicated to translating data from the first data stream into a canonical format;

a second normalization node dedicated to translating data from the second data stream into the canonical format; and a third normalization node dedicated to translating data from the third data stream into the canonical format.

22. The system of claim 21, wherein each of the first data stream, the second data stream, and the third data stream is ingested by the system in a different format, and wherein data from each of the first data stream, the second data stream, and the third data stream is translated to the same canonical format understood by the processor.

23. The system of claim 1, wherein the authentication package further comprises a digital requester timestamp;

wherein the instructions executed by the cloud computing processor further comprises generating the digital requester timestamp by encrypting the requester timestamp utilizing a cryptographic message syntax standard; and wherein the digital requester timestamp is encrypted such that the electronic notary can verify the digital requester timestamp based upon the requester timestamp.

24. The system of claim 1, wherein the instructions executed by the cloud computing processor further comprise:

providing a decrypted digital timestamp to the electronic notary;

rehashing the transaction data based upon the transaction data, the nonce, and the notary timestamp to generate requester-rehashed transaction data;

providing the requester-rehashed transaction data to the electronic notary;

comparing the requester-rehashed transaction data to the decrypted transaction data to determine whether the transaction data is authentic.

25. The system of claim 1, wherein the private key signature is generated by the electronic notary; and wherein the public key certificate is generated by the electronic notary on a per-transaction basis or on a per-day basis.

* * * * *